US009280671B2

(12) United States Patent
Endo et al.

(10) Patent No.: US 9,280,671 B2
(45) Date of Patent: Mar. 8, 2016

(54) SEMICONDUCTOR DEVICE AND ENCRYPTION KEY WRITING METHOD

(71) Applicant: Renesas Electronics Corporation, Kawasaki (JP)

(72) Inventors: Takashi Endo, Kawasaki (JP); Yosuke Tanno, Kawasaki (JP); Yoshiyuki Amanuma, Kawasaki (JP); Yuichiro Nariyoshi, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 252 days.

(21) Appl. No.: 14/061,619

(22) Filed: Oct. 23, 2013

(65) Prior Publication Data

US 2014/0122903 A1    May 1, 2014

(30) Foreign Application Priority Data

Oct. 31, 2012   (JP) ................. 2012-240051

(51) Int. Cl.
*G06F 12/14* (2006.01)
*G06F 21/60* (2013.01)
*G06F 21/74* (2013.01)

(52) U.S. Cl.
CPC .............. *G06F 21/602* (2013.01); *G06F 21/74* (2013.01)

(58) Field of Classification Search
None
See application file for complete search history.

(56) References Cited

U.S. PATENT DOCUMENTS

| 6,282,657 | B1 * | 8/2001 | Kaplan | G06F 8/60 |
| | | | | 711/E12.097 |
| 2002/0073316 | A1 * | 6/2002 | Collins | G06F 21/572 |
| | | | | 713/174 |
| 2003/0046570 | A1 * | 3/2003 | Ronkka | G06F 21/6209 |
| | | | | 713/193 |
| 2009/0113146 | A1 * | 4/2009 | Minz | G06F 21/85 |
| | | | | 711/154 |
| 2012/0084574 | A1 * | 4/2012 | Nakanishi | G06F 21/79 |
| | | | | 713/193 |
| 2012/0216049 | A1 * | 8/2012 | Boivie | G06F 21/57 |
| | | | | 713/189 |

FOREIGN PATENT DOCUMENTS

| JP | 4-102185 A | 4/1992 |
| JP | 2000-155819 A | 6/2000 |
| JP | 2000-252973 A | 9/2000 |
| JP | 2003-333027 A | 11/2003 |
| JP | 2012-80295 A | 4/2012 |

* cited by examiner

*Primary Examiner* — Lisa Lewis
*Assistant Examiner* — Henry Tsang
(74) *Attorney, Agent, or Firm* — McGinn IP Law Group, PLLC

(57) ABSTRACT

A semiconductor device includes a CPU, an EEPROM, and a ROM. The ROM includes an encryption area and a non-encryption area and the encrypted firmware is stored in the encryption area. The semiconductor device includes a decrypter which holds the encryption key, decrypts the encrypted firmware, and supplies the decrypted firmware to the CPU. The EEPROM includes a system area to which an access from the CPU is forbidden in a user mode. The encryption key is divided into split keys of plural bit strings, and stored in the distributed address areas in the system area. An encryption key reading program which is not encrypted is stored in the non-encryption area of the ROM. Executing the encryption key reading program, the CPU reads and reconfigures plural split keys stored in the EEPROM in a distributed manner to restore the encryption key and supplies the restored encryption key to the decrypter.

20 Claims, 15 Drawing Sheets

SEMICONDUCTOR DEVICE AND ENCRYPTION KEY WRITING METHOD

CROSS-REFERENCE TO RELATED APPLICATIONS

The disclosure of Japanese Patent Application No. 2012-240051 filed on Oct. 31, 2012 including the specification, drawings and abstract is incorporated herein by reference in its entirety.

BACKGROUND

The present invention relates to a semiconductor device mounted in an IC (Integrated Circuit) card as an example, provided with a CPU and a ROM (Read Only Memory) which stores an encrypted program to be used by the CPU, and in particular, relates to a technology which can be suitably utilized for improvement of the security level against an attack trying to illegally read the encrypted program.

Generally an IC card is provided as a SoC (System on Chip) (microcomputer) in which a ROM, a RAM (Random Access Memory), an EEPROM (Electrically Erasable Programmable Read-Only Memory), and a CPU (Central Processing Unit) are integrated into a single chip. The IC card is provided with the required minimum number of external terminals, such as a power source, a ground, a clock, a reset, and a serial communication interface. The configuration of the IC card does not allow a direct access to the internal memory thereof and the exchange of data is always performed through serial communication; accordingly the secrecy of the memory content has been assured.

However, the analysis of security equipment by reverse engineering is posing an issue, in association with the advancement in performance of an analysis device. Especially, the reverse engineering of a ROM is posing such an actual threat that the contents of the firmware stored in the ROM are read out. Hitherto, scrambling by a simple combinational circuit has been performed. The configuration of a scramble circuit is kept in secrecy and the secrecy has guaranteed the secrecy of the firmware. However, the advancement in the reverse engineering technology is now allowing even the analysis of the scramble circuit. In view of the above circumstances, it is required to establish encryption of the contents of a ROM such that the firmware cannot be analyzed only by a simple readout of a ROM pattern. In encryption, the secrecy of a method or the secrecy of a key will improve the security level against an attack trying to illegally read out an encrypted program. When an attack which can decode the contents of the ROM with reverse engineering is assumed, it is expected that an encryption method is also analyzed from the physical analysis of the circuit configuration. Accordingly, an encryption key is stored in an electrically rewritable nonvolatile memory, thereby making it difficult to read out the encryption key only by the reverse engineering by means of the optical observation of a physical shape or a circuit configuration.

Patent Literature 1 and Patent Literature 2 disclose inventions concerning security equipment which encrypts and stores a program. The encrypted program is decrypted by use of an encryption key, developed into another storage device, and executed subsequently.

In the IC card, before encryption is performed for the purpose of secrecy of a program which is firmware, the encryption technology has been widely utilized for the purpose of keeping the secrecy of the stored user information and communication, and several methods are known as for storage of the encryption key for that. Patent Literature 3 and Patent Literature 4 disclose technology which improves the security level against an attack trying to read out an encryption key illegally. That is, Patent Literature 3 discloses technology for storing the encryption key in a memory area in an IC card where read-out from the exterior is absolutely difficult, and Patent Literature 4 discloses technology for dividing the encryption key and storing the divided keys in distributed regions in one storage device. Patent Literature 5 discloses technology in which the key information of plural encryption keys is managed in a split manner or in a batch, thereby storing the key information efficiently.

(Patent Literature 1) Published Japanese Unexamined Patent Application No. 2000-155819
(Patent Literature 2) Published Japanese Unexamined Patent Application No. 2003-333027
(Patent Literature 3) Published Japanese Unexamined Patent Application No. Hei 04(1992)-102185
(Patent Literature 4) Published Japanese Unexamined Patent Application No. 2000-252973
(Patent Literature 5) Published Japanese Unexamined Patent Application No. 2012-080295

SUMMARY

The examination performed by the present inventors on Patent Literatures 1, 2, 3, 4, and 5 has revealed that there exist the following new issues.

Patent Literature 1 does not describe about a storing method of an encryption key, in particular, about the technology that improves the security level against an attack trying to illegally read out the encryption key. Patent Literature 2 describes the technology in which an encryption key is divided and stored in plural storage devices in a distributed manner; however, it is necessary to provide plural storage devices, accordingly, it is difficult to employ the technology in a small-scale system such as an IC card.

The storing method of an encryption key described in Patent Literatures 3, 4, and 5 is executed by a program. Therefore, it is difficult to utilize the storing method for the storage of an encryption key employed for encryption of the program itself.

Even if the storing method of an encryption key disclosed by Patent Literature 3 and Patent Literature 4 is applied to the technology disclosed by Patent Literature 1 and Patent Literature 2, it is difficult to improve the security level against an attack trying to read out a program illegally. The reason is as follows. That is, in the technology disclosed by Patent Literature 1 and Patent Literature 2, the encrypted program is decrypted with the use of an encryption key, developed in another storage device, and executed subsequently. Therefore, keeping the secrecy of the encryption key is meaningless to an attack trying to read the developed program which has become a plaintext program after the decryption.

The solution to such issues is explained in the following. The other issues and new features of the present invention will become clear from the description of the present specification and the accompanying drawings.

One embodiment is as follows.

That is, a semiconductor device is provided with a CPU, an electrically rewritable EEPROM, and an electrically non-rewritable ROM. An encryption area and a non-encryption area are provided in the ROM, and encrypted firmware is stored in the encryption area. The semiconductor device is provided with a decrypter which holds an encryption key, decrypts the encrypted firmware and supplies the decrypted firmware to the CPU. The CPU operates in one of operation modes including a system mode and a user mode. The EEPROM is provided with a system area to which an access from the CPU is forbidden in the user mode. An encryption key which has encrypted the firmware is divided into split keys formed by plural bit strings, and is stored in distributed address areas in the system area of the EEPROM.

An encryption key reading program which is not encrypted is stored in the non-encryption area of the ROM. By executing the program by the CPU, the plural split keys held in the EEPROM in a distributed manner are read and reconfigured to restore the encryption key which is then supplied to the decrypter.

Here, the CPU is a processor which interprets and executes an instruction code provided, and is not restricted by the architecture thereof. The CPU may be a CPU of a microcomputer or a micro controller or it may be a multiple-processor and a DSP (Digital Signal Processor).

The effect obtained by the one embodiment is as follows when explained briefly.

That is, it is possible to improve the security level to an attack trying to illegally read out the encrypted program stored in the encryption area of the ROM.

DETAILED DESCRIPTION

1. Outline of Embodiments

Figure 1:
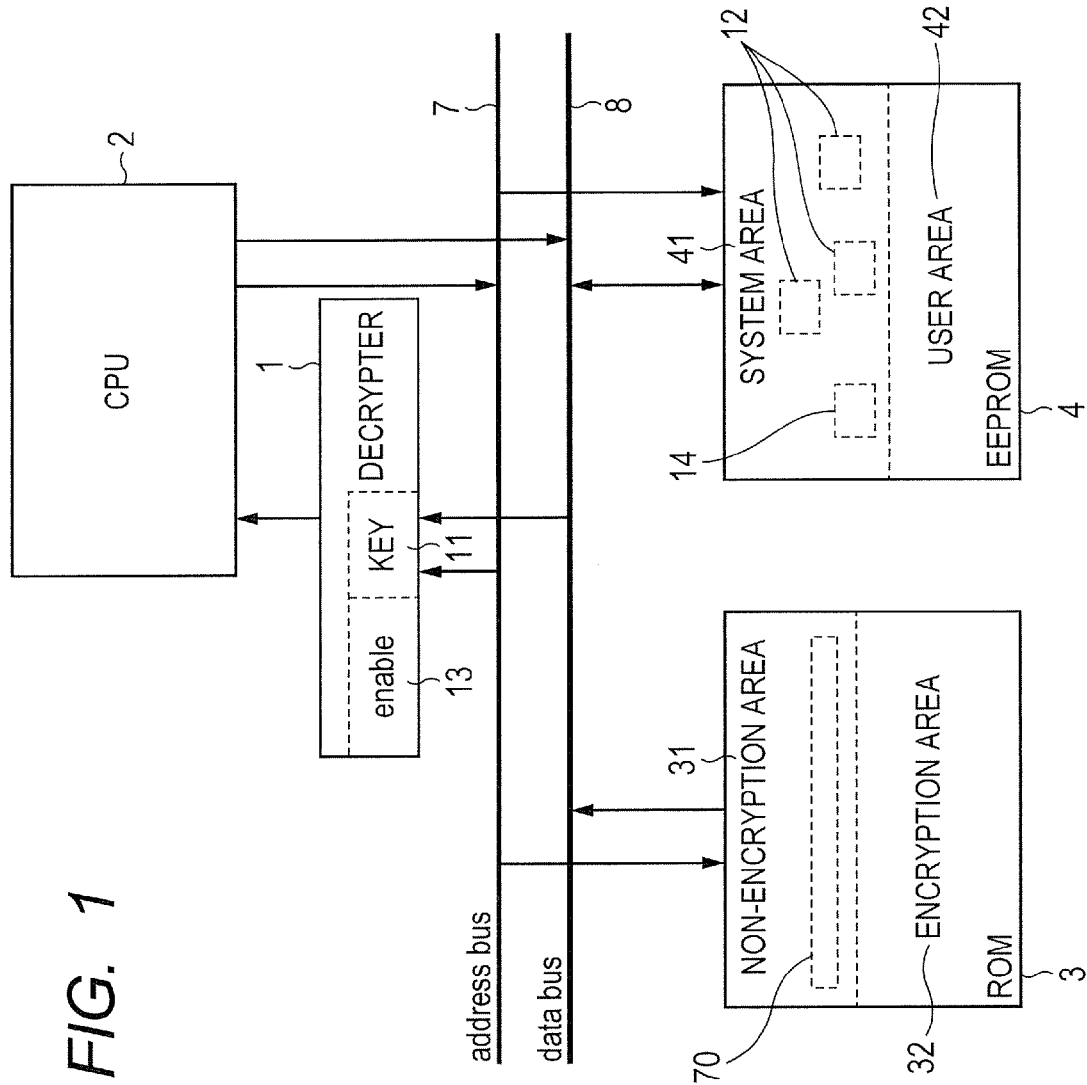
FIG. 1 is a block diagram illustrating a configuration of a semiconductor device 1 according to Embodiment 1.

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

(1) <A Microcomputer Which Divides an Encryption Key and Stores it in a System Area of an EEPROM in a Distributed Manner>

A semiconductor device (9) is provided with following elements. A CPU (CPU 2, a central processing unit) which has a first operation mode (system mode) and a second operation mode (user mode).

An electrically rewritable first nonvolatile memory (EEPROM 4) provided with a first region (system area 41) and a second region (user area 42). The first region is forbidden to access from the CPU in the second operation mode (user mode).

An electrically non-rewritable second nonvolatile memory (ROM 3) provided with a third region (encryption area 32) and a fourth region (non-encryption area 31). The third region can store an encryption code as at least one of an encrypted instruction and encrypted data. A decrypter (1).

Here, the first nonvolatile memory (EEPROM 4) is provided with plural distributed address areas in the first region (system area 41), for holding plural split keys (12) composing an encryption key (11) for decrypting the encryption code.

The decrypter holds the encryption key (11). In the second operation mode (user mode), the decrypter decrypts the encryption code read from the third region (encryption area 31) of the second nonvolatile memory with the use of the encryption key, and supplies the decrypted encryption code to the CPU.

The second nonvolatile memory (ROM 3) holds an encryption key reading program in the fourth region (non-encryption area 31), which is executed by the CPU in the first operation mode (system mode) to restore the encryption key and to supply it to the decrypter, by reading and reconfigurating the plural split keys held in the first nonvolatile memory (EEPROM 4) in a distributed manner.

With this configuration, it is possible to improve the security level against an attack trying to read out the encrypted program illegally.

(2) <An Encryption Key Writing Program>

In Paragraph 1, the semiconductor device is further provided with a communication interface (5). The second nonvolatile memory (ROM 3) holds an encryption key writing program (80) in the fourth region (non-encryption area 31). The encryption key writing program is executed by the CPU to input the encryption key from the exterior through the communication interface and to write the encryption key, in the state of being divided into the split keys, in the distributed address areas in the first region (system area 41) of the first nonvolatile memory (EEPROM).

With this configuration, it is possible to divide the encryption key and to write it in a semiconductor device in a distributed manner, after manufacture of the semiconductor device.

(3) <Authentication Before Encryption Key Writing>

In Paragraph 2, the encryption key writing program executes an authentication step (90) for performing authentication, before the split keys are written in the first nonvolatile memory (EEPROM) With this configuration, it is possible to further improve the security level against an attack which tries to search for a true value of the encryption key by rewriting intentionally the divided encryption key written in the first nonvolatile memory (EEPROM).

(4) <Prohibition of Key Writing in the Case of a User Mode and the Key Write Being Completed>

In Paragraph 3, before the split keys are written in the first nonvolatile memory (EEPROM 4), Step (61) for determining that the operation mode to be operated by the CPU is the first operation mode (system mode) and Step (63) for determining whether the plural split keys are already written in the first nonvolatile memory (EEPROM 4) are executed. When the operation mode to be operated by the CPU is the first operation mode (system mode), and when the plural split keys are not yet written in, the encryption key writing program advances to the authentication step.

With this configuration, it is possible to further improve the security level against an attack which tries to search for a true value of the encryption key by rewriting intentionally the encryption key, in the user mode and in a state where the encryption key is already written in.

(5) <An Encryption Key Written Flag>

In Paragraph 4, the first nonvolatile memory (EEPROM 4) is provided with a region (14) for holding data indicative of whether the plural split keys have already been written in the first region (system area 41).

With this configuration, it is possible to further improve the security level against an attack which tries to search for a true value of the encryption key by rewriting the encryption key written flag (14) intentionally.

(6) <An Encryption Key Written Flag Having Plural Bits>

In Paragraph 5, the data indicative of whether the split keys have already been written has plural bits.

With this configuration, it is possible to further improve the security level against an attack which tries to rewrite the encryption key written flag (14) intentionally.

(7) <Authentication by RSA Encryption>

In one of Paragraph 3 to Paragraph 6, the authentication step includes a step in which, using public keys e and N and an expectation value p of RSA which are held and c inputted from the exterior, the remainder of the e-th power of c when divided by N is calculated and compared with p.

With this configuration, it is possible to further improve the security level of the authentication which is the premise for the encryption key writing.

(8) <Branching to A User Program After Transferring the Key to a Decrypter>

In Paragraph 2, the second nonvolatile memory (ROM 3) holds a program (60) in the fourth region (non-encryption area 31), in which, when it is determined that the operation mode to be operated by the CPU is the second operation mode (user mode) (61), the CPU is shifted to the second operation mode (user mode) after the encryption key reading program is executed. The encryption key reading program is executed by the CPU in the first operation mode (system mode).

With this configuration, it becomes possible to execute the encrypted user program after the split keys (12) are read from the first nonvolatile memory (EEPROM 4) and the restored encryption key (11) is stored in the decrypter (1).

(9) <Distributing to Discontinuous Addresses>

In Paragraph 1, the plural distributed address areas in the first region (system area 41) of the first nonvolatile memory (EEPROM 4) for holding the plural split keys (12) are discontinuous with respect to the physical address in the first nonvolatile memory (EEPROM 4) and discontinuous with respect to the logical address for accessing by the CPU.

With this configuration, even in the cases where the contents of the first region (system area 41) of the first nonvolatile memory (EEPROM 4) are dumped by an attack (dumping attack), it is possible to make broad the space to be searched for the value of the encryption key, thereby improving further the security level.

(10) <Distributing to Addresses with an Unequal Address Interval>

In Paragraph 9, at least one of the interval of the plural physical addresses corresponding to the plural distributed address areas in the first region (system area 41) of the first nonvolatile memory (EEPROM 4) for holding the plural split keys (12) and the interval of the plural logical addresses corresponding to the plural address areas is unequal.

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

(11) <A Key Address Storing Address>

In Paragraph 1, the first nonvolatile memory (EEPROM 4) is provided, in the first region (system area 41), with a key address storing area which stores plural key address values (15) of the plural address areas for storing the plural split keys, and the second nonvolatile memory (ROM 3) holds the address value (20) of the key address storing area in the fourth region (non-encryption area 31).

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

(12) <Distributing to Addresses Specified by a Base Point Address and a Deviation>

In Paragraph 1, each of the plural addresses corresponding to the plural distributed address areas in the first region (system area 41) of the first nonvolatile memory (EEPROM 4) for holding the plural split keys (12) can be calculated by use of a base point address (16) and a deviation (17). The first nonvolatile memory (EEPROM 4) is provided with an address area in the first region (system area 41) for holding the base point address and the deviation.

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

(13) <A Single Chip>

In one of Paragraph 1 to Paragraph 12, the CPU (CPU 2), the first nonvolatile memory (EEPROM 4), the second nonvolatile memory (ROM 3), and the decrypter (1) are formed overlying a single semiconductor substrate.

With this configuration, it is possible to improve the security level against an attack by optical observation or electric probing-based signal observation.

(14) <An Encryption Key Writing Method>

An encryption key writing method for writing an encryption key to a semiconductor device (9) is provided. The semiconductor device is configured with the following elements.

A CPU (2) which has a first operation mode (system mode) and a second operation mode (user mode).

An electrically rewritable first nonvolatile memory (EEPROM 4) provided with a first region (system area 41) and a second region (user area 42). The first region is forbidden to access from the CPU in the second operation mode (user mode).

An electrically non-rewritable second nonvolatile memory (ROM 3) provided with a third region (encryption area 32) and a fourth region (non-encryption area 31). The third region can store an encryption code as at least one of an encrypted instruction and encrypted data.

A decrypter (1) which decrypts the encryption code read from the third region (encryption area 32) of the second nonvolatile memory (ROM 3) with the use of an encryption key and supplies the decrypted encryption code to the CPU in the second operation mode (user mode).

A communication interface (5).

The encryption key writing method includes a first step (81) for inputting the encryption key from the exterior through the communication interface, and a second step (80) for writing the inputted encryption key, in the state of being divided into plural split keys, in plural distributed address areas in the first region (system area) of the first nonvolatile memory (EEPROM).

With this configuration, it is possible to improve the security level against an attack trying to read out the encrypted program illegally.

(15) <Confirmation of an Operation Mode and a Key Written Flag and Authentication>

In Paragraph 14, the encryption key writing method further includes, before the second step, a third step (61) for confirming that the operation mode to be operated by the CPU is the first operation mode (system mode), a fourth step (63) for confirming that the plural split keys are not written in the plural address areas of the first nonvolatile memory (EEPROM), and a fifth step (90) for authenticating the write of the encryption key.

With this configuration, it is possible to further improve the security level against an attack which tries to search for a true value of the encryption key by rewriting intentionally the encryption key, in the user mode and in a state where the encryption key is already written in.

(16) <Branching to a User Program After Fetching a Key into a Decrypter>

In Paragraph 14, the encryption key writing method further includes a sixth step (70) and a seventh step (62).

When it is determined at the third step that the operation mode to be operated by the CPU is the second operation mode (user mode), the sixth Step (70) restores the encryption key and supplies it to the decrypter in the first operation mode (system mode), by reading and reconfigurating the plural split keys which are held in the first nonvolatile memory (EEPROM 4) in a distributed manner.

The seventh step (62) shifts the operation mode of the CPU to the second operation mode (user mode).

With this configuration, it becomes possible to execute the encrypted user program after the divided encryption key (12) is read from the first nonvolatile memory (EEPROM 4) and the restored encryption key (11) is stored in the decrypter (1).

(17) <Distributing to Discontinuous Addresses>

In Paragraph 14, the plural distributed address areas in the first region (system area 41) of the first nonvolatile memory (EEPROM 4) for holding the plural split keys (12) are discontinuous with respect to the physical address in the first nonvolatile memory, and discontinuous with respect to the logical address for accessing by the CPU.

With this configuration, even in the cases where the contents of the first region (system area 41) of the first nonvolatile memory (EEPROM 4) are dumped by an attack (dumping attack), it is possible to make broad the space to be searched for the value of the encryption key, thereby improving further the security level.

(18) <Distributing to Addresses with an Unequal Address Interval>

In Paragraph 17, at least one of the interval of the plural physical addresses corresponding to the plural distributed address areas in the first region (system area 41) of the first nonvolatile memory (EEPROM 4) for holding the plural split keys (12) and the interval of the plural logical addresses corresponding to the plural address areas is unequal.

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

(19) <A Key Address Storing Address>

In Paragraph 14, the encryption key writing method further includes the eighth step.

The eighth step reads the key storing address (15, 19) from one of the first region (system area 41) of the first nonvolatile memory (EEPROM 4) and the fourth region (non-encryption area 31) of the second nonvolatile memory (ROM 3). Here, the key storing address (15, 19) indicates each of the plural address areas for storing the plural split keys (12) in a distributed manner, in the first region (system area 41) of the first nonvolatile memory (EEPROM 4).

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

(20) <Distributing to Addresses Specified by a Base Point Address and a Deviation>

In Paragraph 14, the key storing address indicative of each of the plural address areas for storing the plural split keys (12) in the first region (system area 41) of the first nonvolatile memory (EEPROM 4) in a distributed manner can be calculated by use of a base point address (16) and a deviation (17). The encryption key writing method further includes the ninth step (83, 84) which inputs the base point address and the deviation from the exterior through the communication interface.

With this configuration, even in the cases where the contents of the first region (system area 41) of the first nonvolatile memory (EEPROM 4) are dumped by an attack (dumping attack), it is possible to make further broader the space to be searched for the value of the encryption key, thereby improving further the security level.

2. Details of Embodiments

The embodiments are further explained in full detail.

(Embodiment 1)

FIG. 1 is a block diagram illustrating a configuration of a semiconductor device 1 according to Embodiment 1.

A decrypter 1, a CPU 2, a ROM 3 which is an electrically non-rewritable nonvolatile memory, and an EEPROM 4 which is an electrically rewritable nonvolatile memory are coupled with each other through an address bus 7 and a data bus 8. The CPU 2 can operate in several operation modes including a system mode and a user mode. The ROM 3 is provided with an encryption area 32 for storing an encryption code which includes at least one of an encrypted instruction and encrypted data, and a non-encryption area 31 for storing at least one of a non-encrypted instruction and non-encrypted data. The EEPROM 4 is provided with a system area 41 where an access from the CPU 2 is allowed in the system mode but forbidden in the user mode, and a user area 42 where the access from the CPU 2 is allowed in either of the modes.

The system area 41 of the EEPROM 4 is provided with plural address areas for storing plural split keys 12 which compose an encryption key 11 to be used for decrypting the encryption code stored in the encryption area 32 of the ROM 3. The non-encryption area 31 of the ROM 3 stores an encryption key reading program 70.

When the encryption key reading program 70 is executed by the CPU 2 in the system mode, the plural split keys 12 held in the EEPROM 4 in a distributed manner are read and reconfigured to restore the encryption key 11, which is then supplied to the decrypter 1. The decrypter 1 holds the encryption key 11, decrypts the encryption code read from the encryption area 32 of the ROM 3 with the use of the encryption key 11 in the user mode, and supplied the decrypted encryption code to the CPU 2.

A user program which should be protected is encrypted in advance with the use of the encryption key 11 and stored in the encryption area 32 of the ROM 3. Even if the contents of the encryption area 32 of the ROM 3 are decoded, it is possible to maintain the secrecy of the contents of the user program which should be protected, unless the correct encryption key 11 is known. The encryption key 11 is divided into the split keys which are plural bit strings, and is stored in the system area of the EEPROM in a distributed manner. By dividing and distributing, the combination number for reconfigurating can be increased and the security level can be improved. The split keys 12 which have been divided and stored in a distributed manner are read from the EEPROM 4 by the encryption key reading program 70 which is executed after the power-on, and the reconfigurated encryption key 11 is written in the decrypter 1. Subsequently, the user program stored in the encryption area 32 of the ROM 3 is decrypted by the decrypter 1 with the use of the encryption key 11, and supplied to the CPU 2 as an executable program.

With this configuration, it is possible to improve the security level against an attack trying to read out the encrypted program illegally. The system area 41 of the EEPROM 4 is not allowed to access in the user mode; therefore, it is protected from a dumping attack. Even if the contents of the EEPROM 4 are dumped, the encryption key is divided and stored in a distributed manner; therefore, the search space of the encryption key is enlarged, leading to the improved security level.

The instruction code and data which are stored in memories, such as the ROM 3 and the EEPROM 4, may undergo scramble processing in addition to encryption. In that case, what is necessary is just to insert a descramble circuit in the path from the memory to the CPU 2 through the data bus 8 and the decrypter 1.

It is preferable that the decrypter 1 is provided with an enabling bit 13 which specifies whether to decrypt a cipher or to supply the CPU 2 with the inputted code as it is. Naturally, the encryption key reading program 70 is executed before the encryption key 11 is set to the decrypter 1. When executing a program which is not encrypted such as the encryption key reading program 70, the decrypter 1 is set up not to perform decrypting by the enabling bit 13

It is preferable that the decrypter 1 is provided with a register for holding the encryption key 11. At this time, an initial value of the register, that is, a reset value immediately after power-on can be utilized as an initial value of the encryption key 11. A program such as the encryption key reading program 70 which cannot be executed if encrypted by the correct encryption key 11 is encrypted in advance with the use of the initial value of the encryption key 11 which is the reset value of the register. In lieu of providing the enabling bit 13 described above, it is possible to design such that the decrypter 1 can perform the decryption with the use of the initial value of the register as the encryption key until the correct encryption key 11 is written in. In this case, it is necessary to encrypt the encryption key reading program 70 with the use of the initial value of the encryption key 11 to the middle, and to encrypt it with the use of the correct encryption key 11 from the point immediately after the write step of the correct encryption key 11.

The encryption key reading program 70 is called from a reset routine 60 which operates immediately after the power-on of the semiconductor device. The reset routine 60 is executed before the encryption key 11 is set in the decrypter 1, as is the case with the encryption key reading program 70. Therefore, it is necessary that the reset routine 60 is encrypted in a simple way as described above or not encrypted. The reset routine 60 is also stored in the non-encryption area 31 of the ROM 3.

It is preferable that the EEPROM 4 is provided, in the system area 41, with a region which stores a key written flag 14 indicative of whether the split keys 12 are already written or not. The description of the operation and effect will be included in the following explanation about the reset routine.

Figure 2:
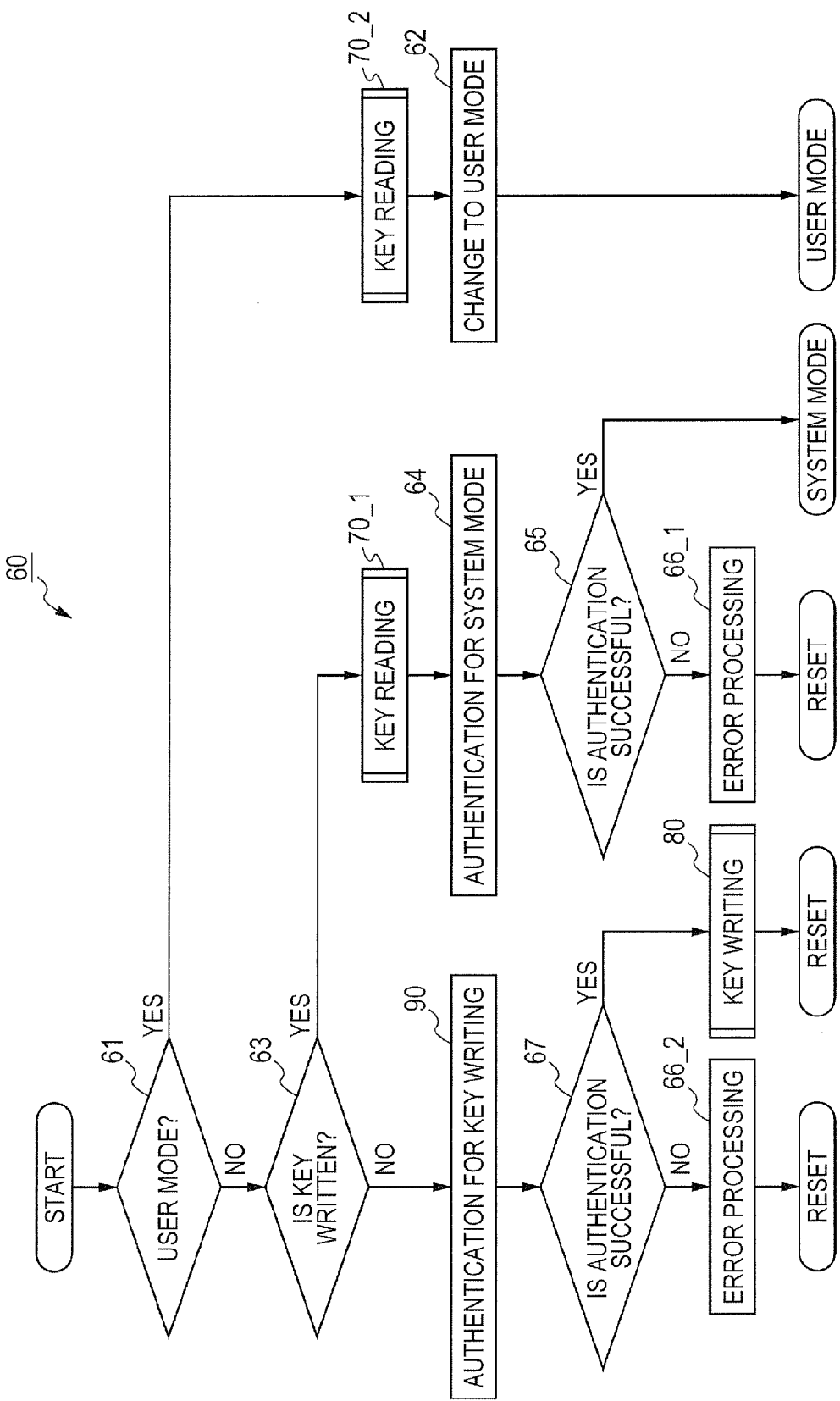
FIG. 2 is a flow chart illustrating an example of a reset routine in the semiconductor device according to Embodiment 1.

FIG. 2 is a flow chart illustrating an example of the reset routine in the semiconductor device according to Embodiment 1.

The reset routine 60 is activated by the power-on reset. First, the operation mode to be operated by the CPU 2 is determined (Step 61). The operation mode to be operated by the CPU 2 is specified by the state of a terminal in an ordinary microcomputer. However, a microcomputer which is employed for an IC card with a high security level cannot provide such a terminal. Accordingly, the operation mode is specified by a nonvolatile memory such as the EEPROM 4, or the like. The present determining (Step 61) itself operates in the system mode.

When the operation mode to be operated by the CPU 2 is the user mode, the operation mode is changed to the user mode (Step 62) after the key reading 70_2 is performed. By the key reading 70_2, the split keys 12 are read from the EEPROM 4, and the reconfigurated encryption key 11 is written in the decrypter 1. Subsequently, the user program stored in the encryption area 32 of the ROM 3 is decrypted by the decrypter 1 with the use of the encryption key 11, and supplied to the CPU 2 as a program executable in the user mode.

When the operation mode to be operated by the CPU 2 is the system mode, it is determined whether the split keys 12 are already written in the EEPROM 4 or not written yet (Step 63). At this time, it is preferable to read the key written flag 14 for the determining. When the split keys 12 are already written in the EEPROM 4, the key reading 70_1 is performed to read the split keys 12, and the reconfigurated encryption key 11 is written in the decrypter 1. Subsequently, the authentication for the system mode is performed (Step 64). When authenticating is successful (Step 65), operation in the system mode is started. On the contrary, when authenticating is unsuccessful (Step 65), an error processing (Step 66_1) is performed, and the system is reset. The security level can be improved by authenticating before starting the operation in the system mode.

When it is determined that the operation mode to be operated by the CPU 2 is the system mode and the split keys 12 are not yet written in the EEPROM 4 (Step 63), the authentication for key writing (Step 90) is performed. As a result, when authenticating is successful (Step 67), the key writing (Step 80) is performed, and the system is reset. When authenticating is unsuccessful (Step 67), an error processing (Step 66_2) is performed, and the system is reset.

At the key writing (Step 80), the encryption key 11 is received from the exterior and divided into plural bit strings to generate the split keys 12. Then, the split keys 12 are written in the system area 41 of the EEPROM 4 in a distributed manner. It is also preferable that plural split keys 12 generated by dividing the encryption key 11 into plural bit strings externally in advance may be written in the system area 41 of the EEPROM 4 in a distributed manner. With this configuration, it is possible to divide the encryption key and to write it in a semiconductor device in a distributed manner, after manufacture of the semiconductor device.

As described above, the configuration is designed such that, in the user mode, the key writing (Step 80) is not executed when the key is already written and when authenticating is unsuccessful in the authentication for key writing (Step 90). With this configuration, it is possible to improve the security level against an attack which tries to search for a true value of the encryption key by rewriting intentionally the split keys 12 written in the EEPROM 4 one by one.

The key written flag 14 may be formed by one bit; however, it is more preferable that the key written flag 14 is formed by plural bits managed secretly. With this configuration, it is possible to improve the security level against an attack trying to rewrite the key written flag 14 intentionally.

A quantitative consideration is now given to dividing and distributing methods of the encryption key 11.

One of the indices expressing the security level of a cipher is the magnitude of the search space of an encryption key. For example, when the encryption key is 128 bits, a true encryption key is surely included in $2^{128}$ kinds of combination. Therefore, the magnitude of the search space is $2^{128}$.

As compared with this, it is assumed that the entire EEPROM 4 in which the split keys 12 have been written is read out by memory dump. Here, the search space for searching for and reconfigurating the split keys 12 from the memory space of the EEPROM 4 is calculated. For example, when a key of 128 bits (16 B) is stored in the memory space of 256 KB with every one word (2 B) in a random address area, eight addresses need to be selected from the addresses of 128K kinds in the combination considering the difference in order as well. Therefore, there are combinations of 2(17×8) kinds=$2^{136}$ kinds. This is larger than the search space of $2^{128}$ which an encryption key of 128 bits has in principle. Therefore, the security level does not deteriorate. When a key of 128 bits (16 B) is collectively stored in one place of the memory space of 256 KB on the other hand, the combination of how to cut out 16B from the memory space of 256 KB becomes 218 kinds. Compared with the search space of $2^{128}$ which the encryption key has originally, the search space is reduced greatly. Therefore, the security level deteriorates markedly.

The number of dividing the encryption key can be decided on the basis of the search space of the key, with the size of the real address space of a memory for storing the key as a parameter. For example, the search space can be expressed as follows.

$$\sum_{i=1}^{L} \min\left(m_i, \log_2 R - \frac{M}{8}\right) \quad \text{(Mathematical 1)}$$

In Mathematical 1, R (byte) expresses the size of the real address space of the memory, L expresses the number of divisions of the key, M expresses the bit length of the key, and mi expresses the bit length of the i-th split key of the divided split keys. Normally, the real storage space is larger than the bit length of the key; therefore, it is possible to assume the relation as follows.

$$R \gg \frac{M}{8} \quad \text{(Mathematical 2)}$$

Then, Mathematical 1 can be approximated as follows.

$$\sum_{i=1}^{L} \min(m_i, \log_2 R) \quad \text{(Mathematical 3)}$$

When the key is divided into the same bit length, Mathematical 3 reduces to the following expression.

$$L \cdot \min\left(\frac{M}{L}, \log_2 R\right) \quad \text{(Mathematical 4)}$$

When the following relation is satisfied here, $$\frac{M}{L} < \log_2 R \quad \text{(Mathematical 5)}$$

it means that it is faster to perform exhaustive search of the key rather than finding out where the key is stored in the real address space of the memory.

Such a case happens when the bit length M of the key is short. Ordinarily, the real storage space has the size which can be expressed by the address of ten-odd bits. Accordingly, when the number of divisions L is small, such a case does not happen. Therefore, when it is desirable to set the search space greater than S bits against the dumping attack, it suffices that the number of divisions is set up so that the following relation is satisfied.

$$L \cdot \log_2 R > S \quad \text{(Mathematical 6)}$$

Since R may be assumed to be larger than unity, the following relation is satisfied.

$$L > \frac{S}{\log_2 R} \quad \text{(Mathematical 7)}$$

Judging from the power of the current computer, S of about 80 to 128 bits is required. Therefore, when the real storage space of 256 KB is assumed for example, the following relation is derived.

$$L > \frac{80}{\log_2 2^{18}} = 4.4 \qquad \text{(Mathematical 8)}$$

It is seen that it is just necessary to divide the key into 5 or more.

In the present embodiment, the encryption key is protected from the dumping attack by storing the split keys in the system area of the EEPROM 4 to which an access in the user mode is very difficult. Furthermore, by choosing the number of divisions of the encryption key appropriately as described above, it is possible to keep the search space large enough, even if the security is broken and the dumping attack is allowed.

In order to realize a large search space by division of the key as described above, it is preferable to store the split keys in discontinuous addresses in the memory. This is because the division effect will be lost when the split keys are stored in continuous addresses and the aggressor knows the fact. Even when stored in discontinuous addresses, if the address interval is equal, the division effect will be lost when the aggressor knows the fact. Therefore, it is preferable that the address interval is unequal. The address in the present case refers to the physical address of the memory and the logical address seen from the CPU. Although it is preferable that both of the physical address and the logical address are unequal, even when only one of them is discontinuous, there is the improvement effect of the security level.

The semiconductor device illustrated in FIG. 1 can be formed overlying a single semiconductor substrate using the well-known integrated circuit manufacturing method.

Figure 3:
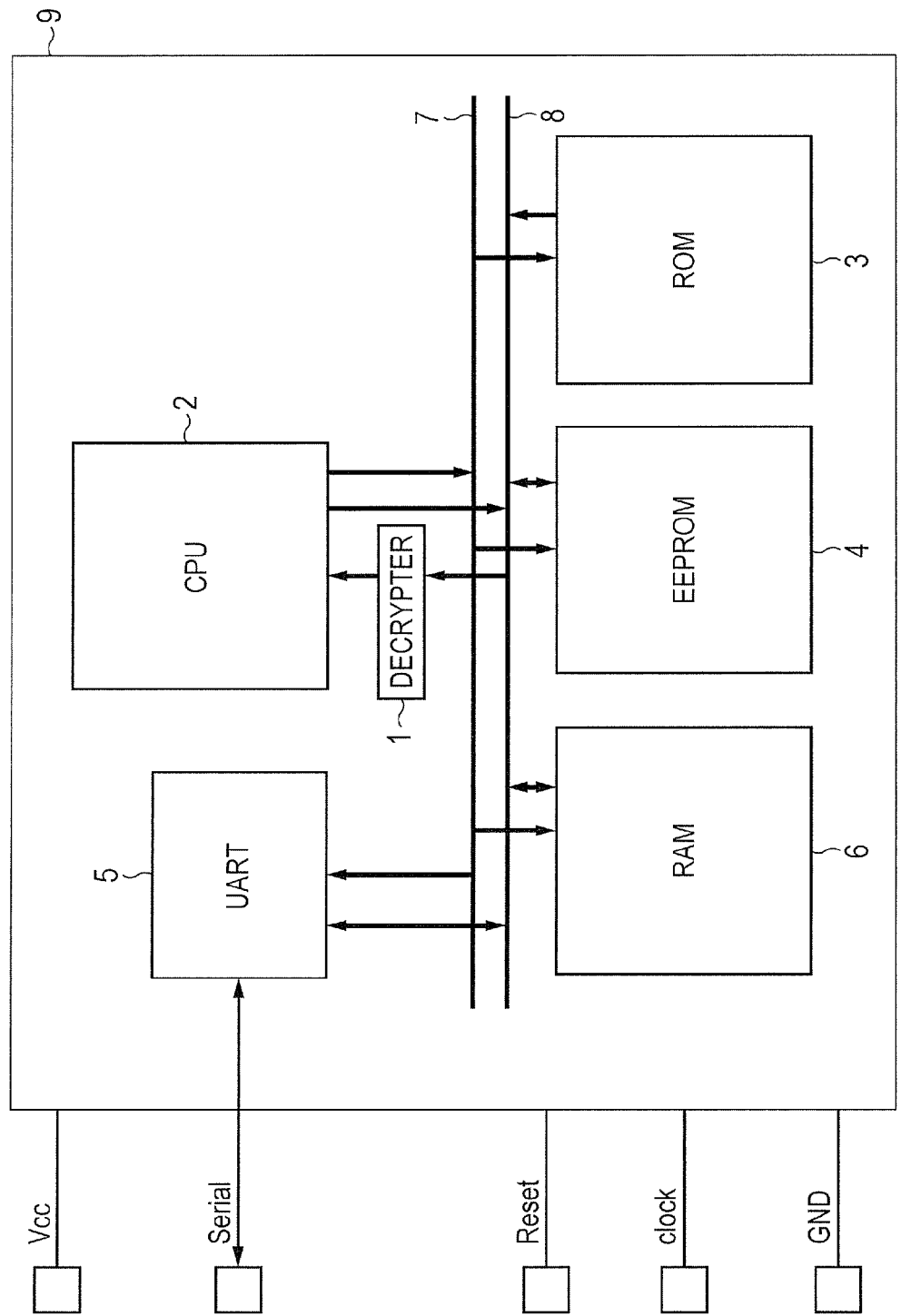
FIG. 3 is a block diagram illustrating a configuration of an LSI according to Embodiment 1.

FIG. 3 is a block diagram illustrating a configuration of an LSI according to Embodiment 1. The LSI 9 is formed overlying a single silicon substrate for example. The LSI 9 is configured with a decrypter 1, a CPU 2, a ROM 3, an EEPROM 4, a UART 5, and a RAM 6, which are coupled with each other via an address bus 7 and a data bus 8. The UART 5 is a Universal Asynchronous Receiver Transmitter. The UART 5 may be a USART (Universal Synchronous and Asynchronous Receiver Transmitter) with a synchronous receiver transmitter added. The communication interface is not restricted to the UART or the USART but may be any kind of communication interface. The LSI 9 is provided with terminals of a power source including a VCC and a GND, a reset, a clock, and a signal terminal of the UART 5. Although not shown, the LSI 9 may be provided with several spare terminals. When an on-chip oscillator is provided, the clock terminal can be omitted. When an on-chip power-on reset circuit is provided and when the system design is prepared assuming only a power-on reset as a reset, the reset terminal can be also omitted. By being provided with necessary minimum terminals, it becomes difficult to perform optical or electrical observation of the state of the interior of the LSI 9; accordingly it is possible to improve the security level against an attack by optical observation or electric probing-based signal observation and others.

In a secure microcomputer in which the contents of the ROM 3 are encrypted and decrypted in real time when the CPU 2 executes the program in the ROM 3, an encryption key for the decryption is not set up in a ROM or a circuit in a chip in advance, but written in an electrically rewritable nonvolatile memory, such as an EEPROM, after manufacturing. Thereby, the risk of the key leakage by reverse engineering is reduced. Immediately after the manufacture of the chip, except for the processing for writing an encryption key for decryption, the program is stored in the state of being encrypted and cannot be executed by the CPU 2. The program can be utilizes after the encryption key is written. When shipped to a user, it is possible to prohibit accessing in the user mode to the contents of the non-encryption area 31 of the ROM 3, such as a setup of the encryption key.

In order to write the encryption key, by dividing or already divided, in the system area 41 of the EEPROM 4 in a distributed manner, the encryption key write program 80 is executed. The encryption key write program 80 must be executed before the write of the encryption key. Therefore, the instruction code thereof cannot be encrypted inevitably, and is stored in the non-encryption area 31 of the ROM 3.

It is also preferable that the encryption key writing program 80 is once written in the RAM 6 or the EEPROM 4 before shipping, in lieu of being stored in the LSI, and is executed to write the encryption key in a distributed manner. Then, the encryption key writing program 80 written in the RAM 6 or the EEPROM 4 is erased before shipping. Accordingly, it is possible to protect from an attack which knows the contents of the encryption key writing program 80. On the other hand, the setup which allows execution of the non-encrypted program in the RAM 6 or the EEPROM 4 is left in the LSI. In that sense, the vulnerability may be caused.

(Embodiment 2)
<Specifying an Address for Storing the Split Keys in Terms of a Key Storing Address>

Figure 4:
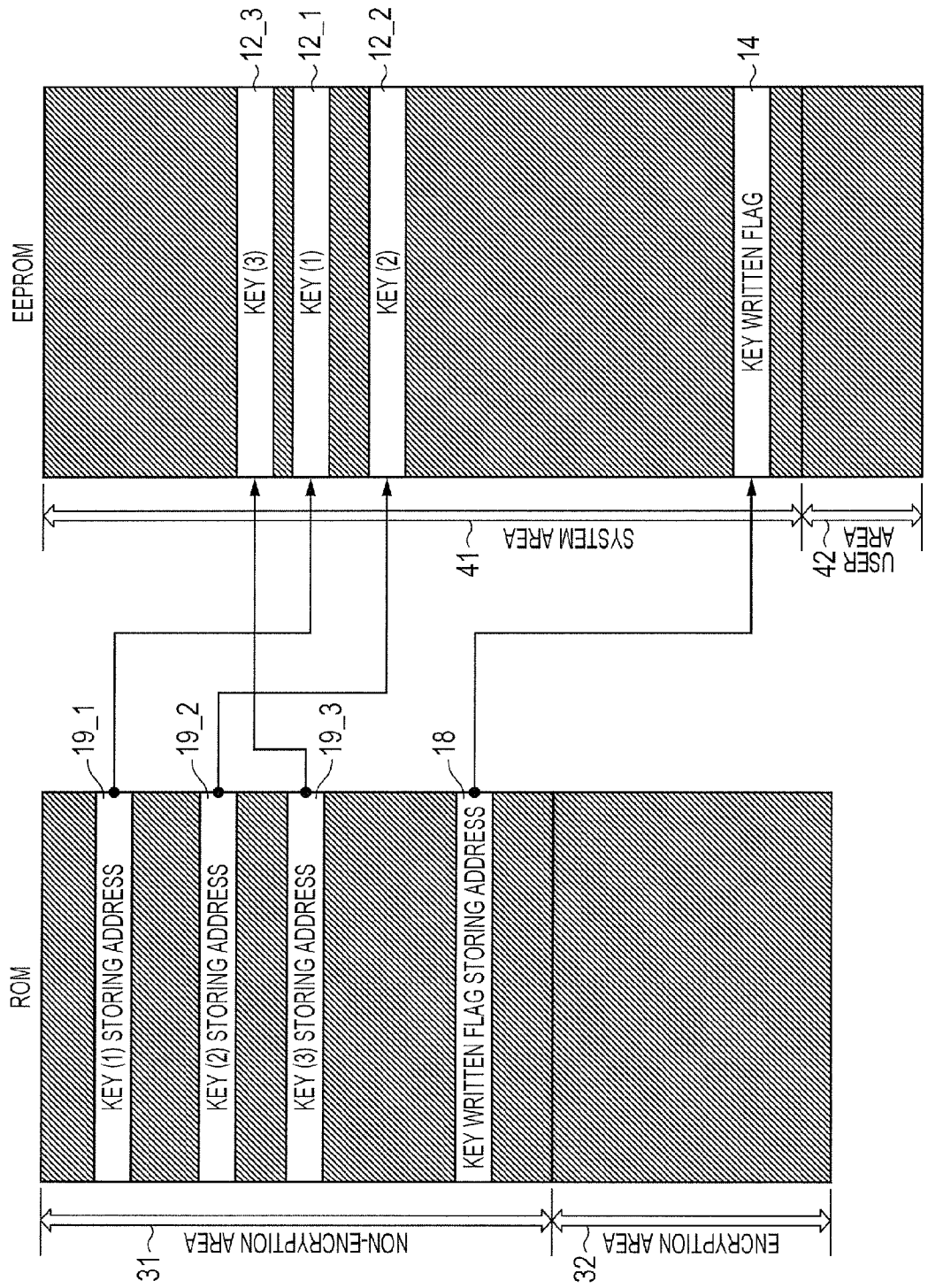
FIG. 4 is a memory map of a ROM and an EEPROM in an embodiment in which a key storing address specifies an address to store split keys.

FIG. 4 is a memory map of a ROM and an EEPROM in the present embodiment in which a key storing address specifies an address to store split keys. The key storing address is assigned to a different region in the logical address space seen from the CPU 2. The ROM 3 is provided with a non-encryption area 31 and an encryption area 32, and the EEPROM 4 is provided with a system area 41 and a user area 42.

The key storing addresses 19_1, 19_2, and 19_3 and the key written flag storing address 18 are respectively values of the addresses for storing the split keys 12_1, 12_2, and 12_3 and the key written flag 14 in the system area 41 of the EEPROM 4. The key storing addresses 19_1, 19_2, and 19_3 and the key written flag storing address 18 are stored in the non-encryption area of the ROM 3. The reset routine 60 determines whether the key write is completed or not at Step 63 as shown by the flow chart illustrated in FIG. 2. At this time, according to the key written flag storing address 18, the key written flag 14 of the EEPROM 4 is read and the value is determined. The key writing 80 writes the split keys 12_1, 12_2, and 12_3 in the EEPROM 4 according to the key storing address 19_1, 19_2, and 19_3. The key reading 70_1 and 70_2 reads the split keys 12_1, 12_2, and 12_3 from the EEPROM 4 according to the key storing addresses 19_1, 19_2, and 19_3, and writes them in the decrypter 1.

Figure 10:
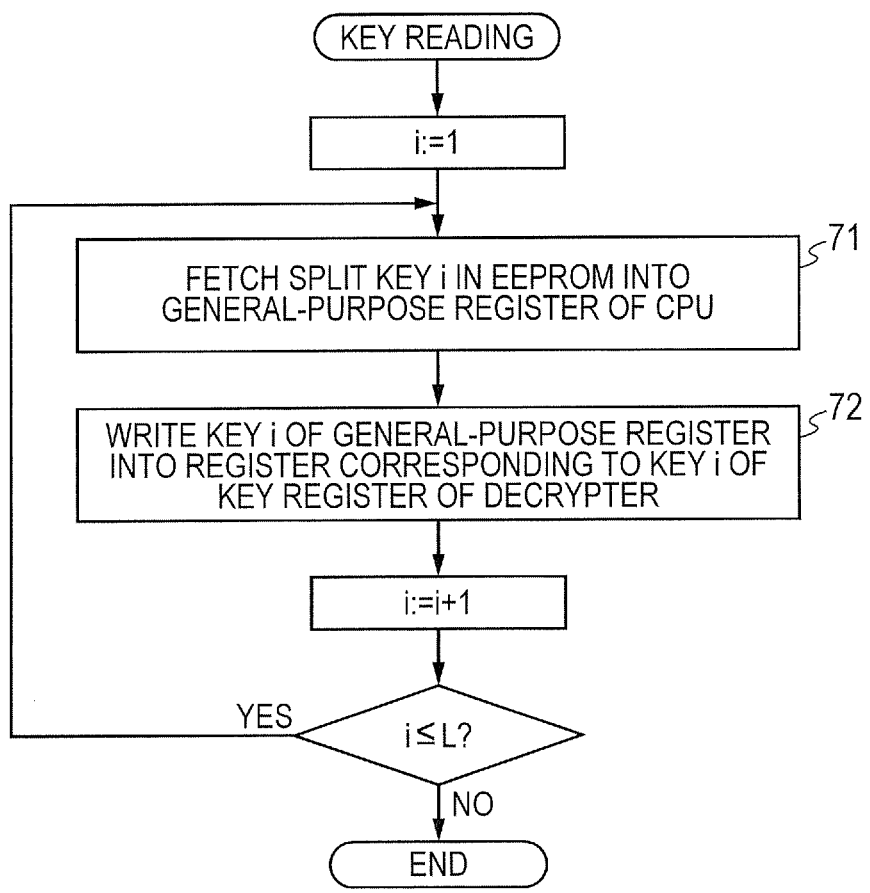
FIG. 10 is a flow chart illustrating key reading (loop) in an embodiment in which a key storing address specifies an address to store split keys.

FIG. 10 is a flow chart illustrating key reading (loop) in the present embodiment in which a key storing address specifies an address to store split keys. The i-th split key 12_i in the EEPROM 4 is fetched into a general-purpose register of the CPU 2 (Step 71), and the i-th split key 12_i fetched into the general-purpose register is written in a register corresponding to the i-th split key 12_i in the key registers of the decrypter 1 (Step 72). Assuming that the number of divisions of the encryption key is L, Steps 71 and 72 are repeatedly executed by the loop repeating i from 1 to L.

Figure 11:
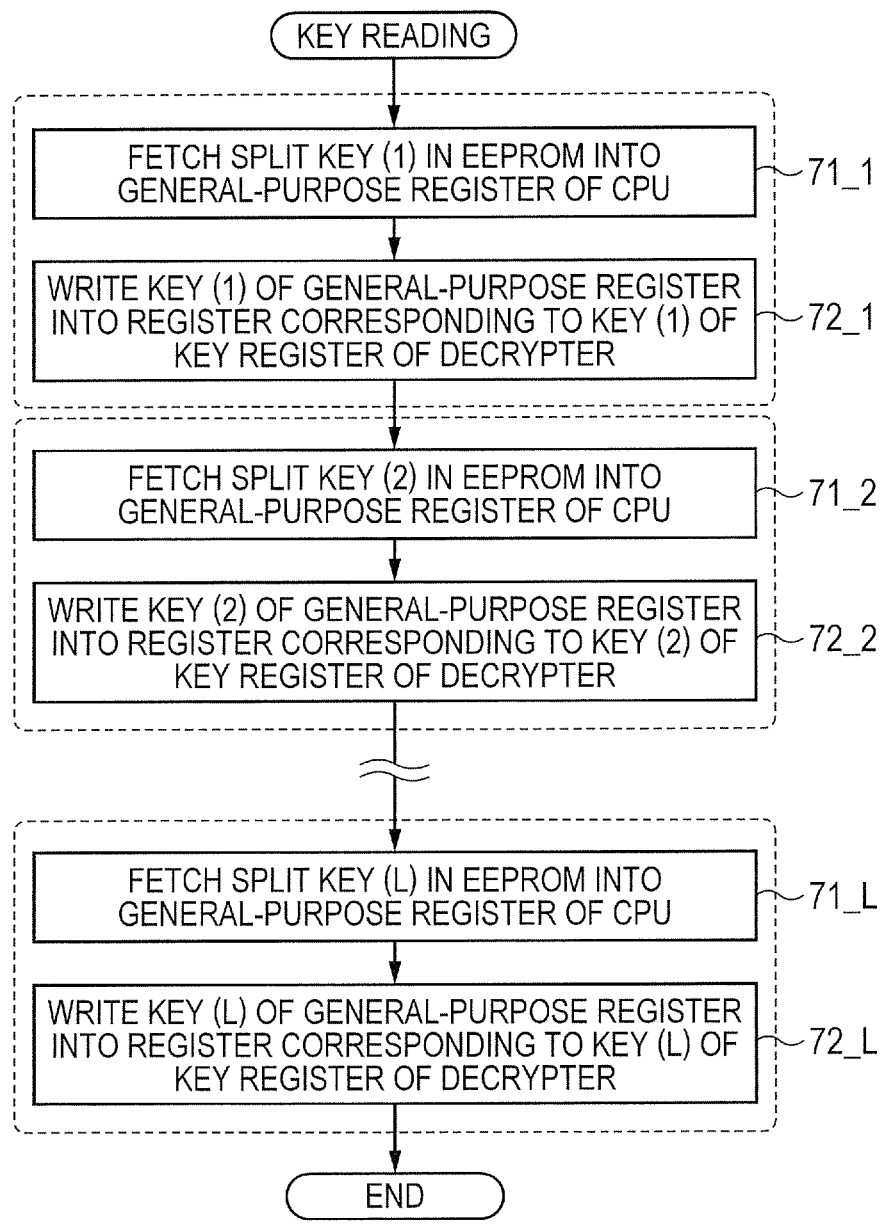
FIG. 11 is a flow chart illustrating key reading (loop unrolling) in an embodiment in which a key storing address specifies an address to store split keys.

FIG. 11 is a flow chart illustrating the key reading (loop unrolling) in the present embodiment. In contrast with the key reading 70 illustrated in FIG. 10 in which Steps 71 and 72 are repeatedly executed by a loop, the key reading illustrated in FIG. 11 is executed, not by using a loop but by the instruction codes which describe sequentially L-piece instruction codes of the split key reading from the EEPROM 4 (Step 71) and the key writing to the decrypter 1 (Step 72). By eliminating the loop control, it is possible to improve the security level against an attack which rewrites only a portion of the key location by destroying temporarily the read value of the register for controlling a loop by means of laser radiation etc. and reducing the loop count.

(Embodiment 3)
<Specifying an Address for Storing Split Keys Via the Key Address Specified by the Key Address Storing Address>

The encryption key writing program 80 is stored in the non-encryption area 31 of the ROM 3. Therefore, it cannot deny a possibility that the encryption key writing program 80 may be known by an aggressor through an attack of optical observation of the ROM 3. In such a case, the specification method of the address for storing the split keys described in Embodiment 2 has a possibility that the address of the EEPROM 4 at which the split keys 12 are stored may be detected, by observing the ROM 3 and analyzing the contents of the encryption key writing program 80. The split keys 12 are stored in the system area 41 of the EEPROM 4; accordingly, granting that the design makes it difficult for the user to access, it is degradation of the security level that the address to store the split keys 12 is detected.

Therefore, Embodiments 3 and 4 present a specification method of the address to store the split keys, in which a serious degradation of the security level is not caused even by the analysis of the contents of the encryption key writing program 80.

Figure 5:
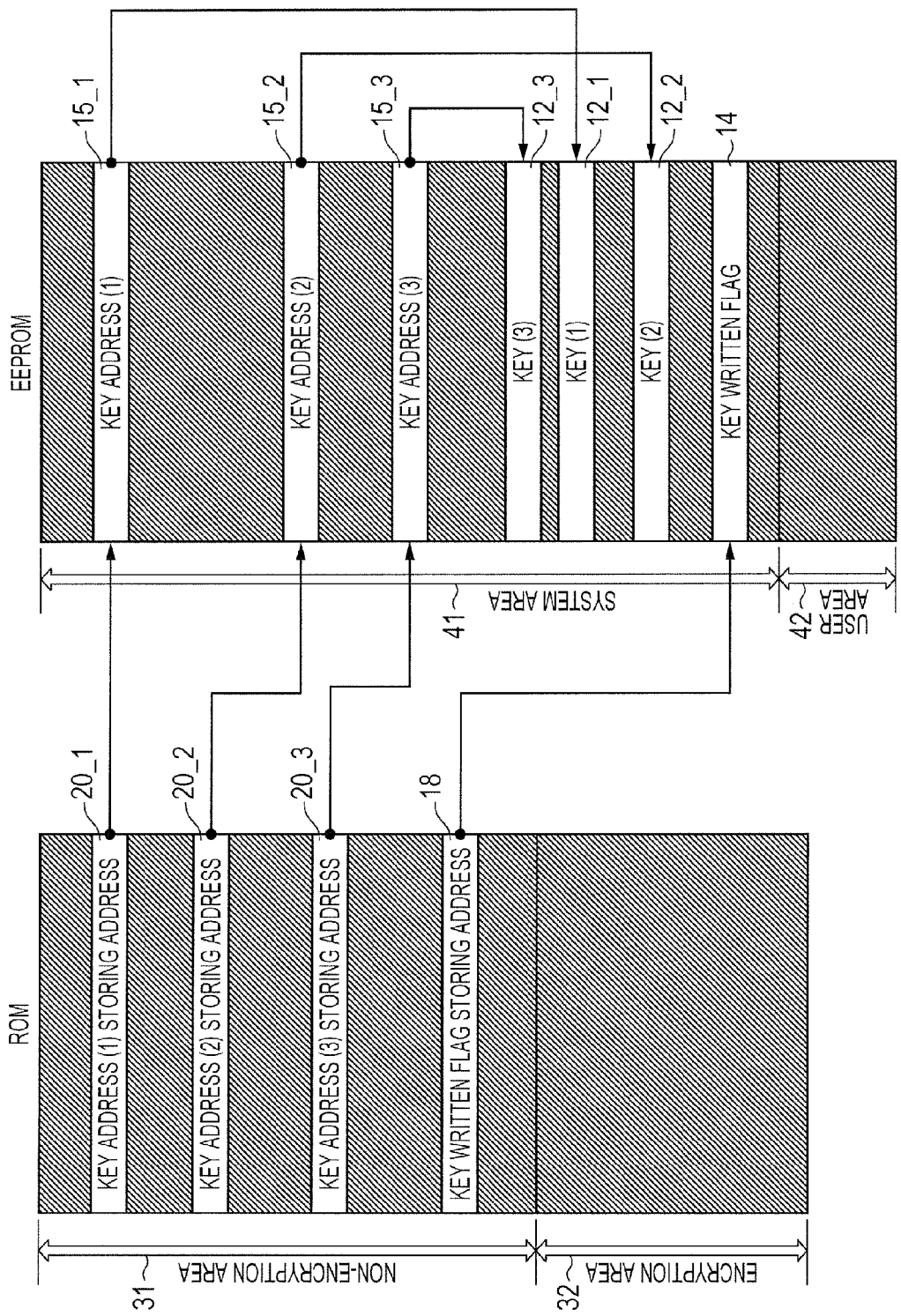
FIG. 5 is a memory map of a ROM and an EEPROM in an embodiment in which a key address storing address specifies a key address and the key address specifies an address to store split keys.

FIG. 5 is a memory map of a ROM and an EEPROM in the present embodiment in which a key address storing address specifies a key address and the key address specifies an address to store the split keys. These addresses are assigned to different regions in the logical address space seen from the CPU 2. The ROM 3 is provided with a non-encryption area 31 and an encryption area 32, and the EEPROM 4 is provided with a system area 41 and a user area 42.

The addresses to write the split keys 12_1, 12_2, and 12_3 are stored in the system area 41 of the EEPROM 4 as the key addresses 15_1, 15_2, and 15_3. The addresses to store the key addresses 15_1, 15_2, and 15_3 are stored in the non-encryption area of the ROM 3 as the key address storing addresses 20_1, 20_2, and 20_3. The address to store the key written flag 14 is specified by the key written flag storing address 18, as is the case with Embodiment 2. The reset routine 60 determines whether the key write is completed or not at Step 63 as shown by the flow chart illustrated in FIG. 2. At this time, as is the case with Embodiment 2, according to the key written flag storing address 18, the key written flag 14 of the EEPROM 4 is read and the value is determined. The key addresses 15_1, 15_2, and 15_3 are inputted from the exterior, via the UART 5 for example, and are written in the system area 41 of the EEPROM 4 which is specified by the key address storing addresses 20_1, 20_2, and 20_3. The key writing 80 writes the split keys 12_1, 12_2, and 12_3 in the EEPROM 4, according to the key addresses 15_1, 15_2, and 15_3. At this time, the split keys 12_1, 12_2, and 12_3 are inputted from the exterior, via the UART 5 for example. The key reading 70_1 and 70_2 read the split keys 12_1, 12_2, and 12_3 from the EEPROM 4 according to the key addresses 15_1, 15_2, and 15_3 and write them in the decrypter 1.

The EEPROM 4 stores information by means of the change of an electric state; accordingly, it is substantially impossible to read the information by the optical observation. Therefore, the security level is higher than the ROM 3. In the present embodiment, it is possible to improve the security level higher than in Embodiment 1, by allotting the key addresses 15_1, 15_2, and 15_3, which are the addresses to store the split keys 12_1, 12_2, and 12_3, in the system area 41 of the EEPROM 4.

Figure 12:
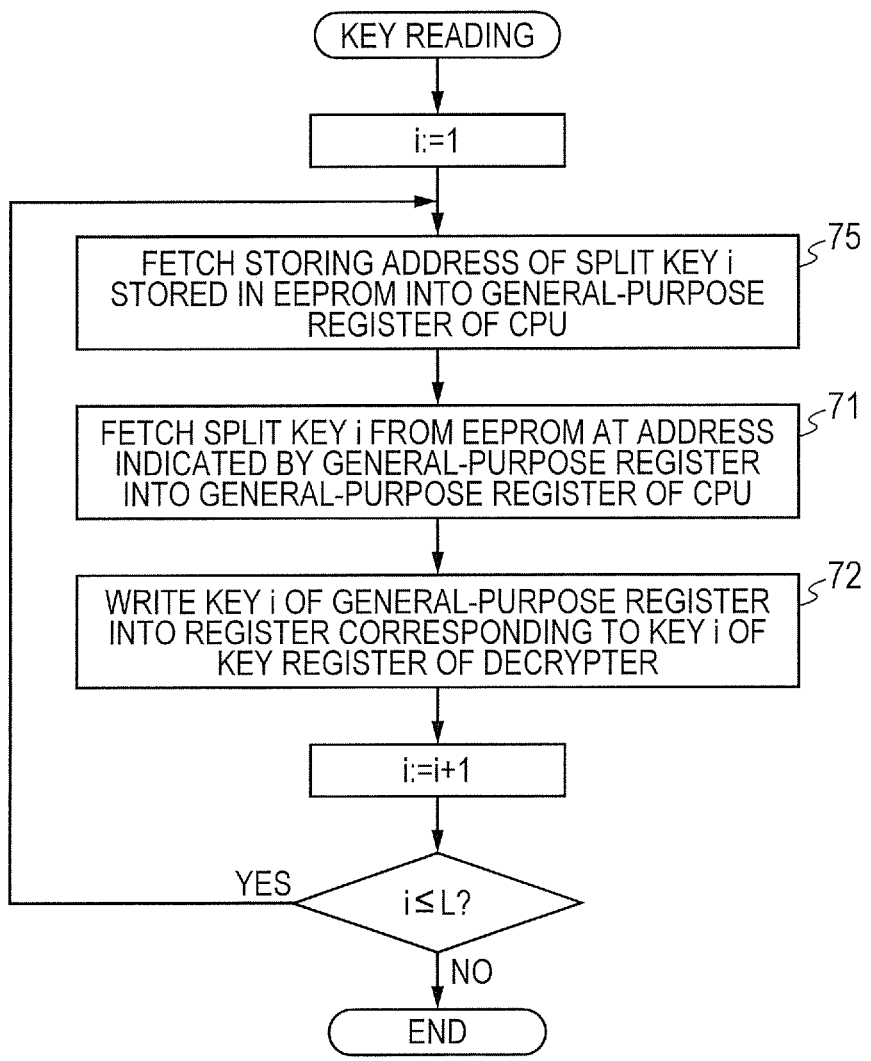
FIG. 12 is a flow chart illustrating key reading (loop) in an embodiment in which a key address storing address specifies a key address and the key address specifies an address to store split keys.

FIG. 12 is a flow chart illustrating key reading (loop) in the present embodiment in which a key address storing address specifies a key address and the key address specifies an address to store split keys. A key address 15_i which is the address at which the i-th split key 12_i is stored in the EEPROM 4 is fetched into a general-purpose register of the CPU 2 (Step 75). Next, the i-th split key 12_i is fetched from the EEPROM 4 at the address indicated by the general-purpose register of the CPU 2 into the general-purpose register of the CPU 2 (Step 71). The i-th split key 12_i fetched into the general-purpose register is written to a register corresponding to the i-th split key 12_i in the key registers of the decrypter 1 (Step 72). Assuming that the number of divisions of the encryption key is L, Steps 75, 71, and 72 are repeatedly executed by the loop repeating i from 1 to L.

When compared with the key reading in Embodiment 2 illustrated in FIG. 10, Step 71 serves as a load instruction by the register indirect addressing, and the value of the general-purpose register is determined by the load instruction at Step 75 executed before that.

Figure 13:
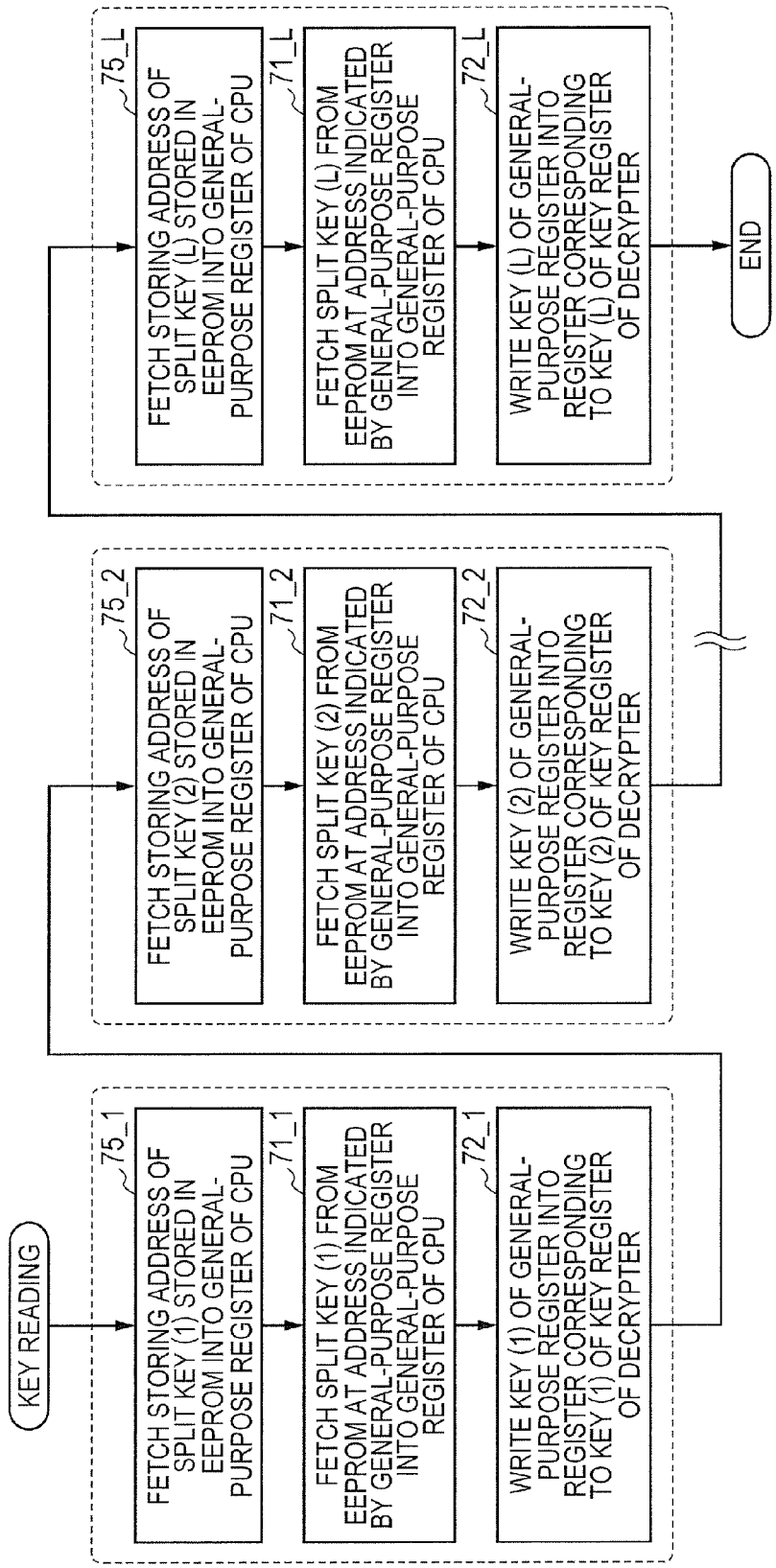
FIG. 13 is a flow chart illustrating key reading (loop unrolling) in an embodiment in which a key address storing address specifies a key address and the key address specifies an address to store split keys.

FIG. 13 is a flow chart illustrating the key reading (loop unrolling) in the present embodiment. In contrast with the key reading 70 illustrated in FIG. 12 in which Steps 75, 71, and 72 are repeatedly executed by a loop, the key reading according to the present embodiment is executed, not by using a loop, but by the instruction code which describes sequentially L-piece instruction codes of Steps 75, 71, and 72. As is the case with Embodiment 2, by eliminating the loop control, it is possible to improve the security level against an attack which rewrites only a portion of the key location by destroying temporarily the read value of the register for controlling a loop by means of laser radiation etc. and reducing the loop count.

(Embodiment 4)
<Specifying an Address for Storing the Split Keys by a Base Point Address and a Deviation>

In Embodiment 3, the address to store the split keys is specified through the intermediary of an indirect pointer, such that a key address storing address specifies a key address and the key address specifies an address to store the split keys. Accordingly, tracking is made difficult and the security level is improved. In contrast with this, in the present embodiment, tracking is made difficult with the use of a certain function for specifying the address to store the split keys. Accordingly, the security level is improved. For example, the address to store the split keys is calculated from a base point address and a deviation.

Figure 6:
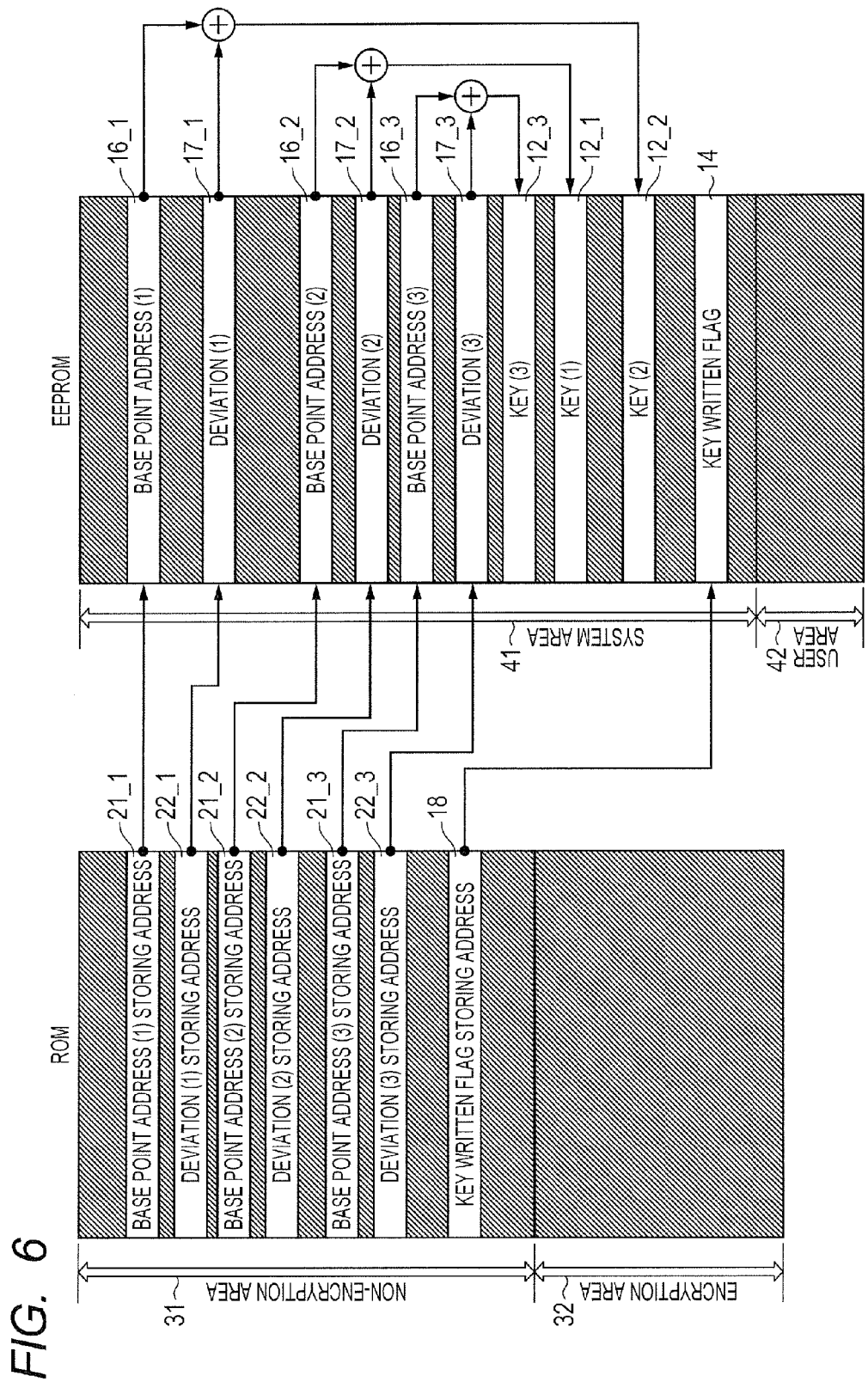
FIG. 6 is a memory map of a ROM and an EEPROM in an embodiment in which a base point and a deviation specify an address to store split keys.

FIG. 6 is a memory map of a ROM and an EEPROM in the present embodiment in which a base point and a deviation specify an address to store the split keys. The these addresses are assigned to respectively different regions in the logical address space seen from the CPU 2. The ROM 3 is provided with a non-encryption area 31 and an encryption area 32, and the EEPROM 4 is provided with a system area 41 and a user area 42.

The addresses to write the split keys 12_1, 12_2, and 12_3 are given by the sum of the base point addresses 16_1, 16_2, and 16_3 and the deviations 17_1, 17_2 and 17_3, respectively. The base point addresses 16_1, 16_2, and 16_3 and the deviations 17_1, 17_2, and 17_3 are stored in the system area 41 of the EEPROM 4. The addresses to store the base point addresses 16_1, 16_2, and 16_3 and the deviations 17_1, 17_2, and 17_3 are respectively stored in the non-encryption area of the ROM 3 as the base point address storing addresses 21_1, 21_2, and 21_3 and the deviation storing addresses 22_1, 22_2, and 22_3. The address to store the key written flag 14 is specified by the key written flag storing address 18, as is the case with Embodiments 2 and 3. The reset routine 60 determines whether the key write is completed or not at Step 63 as shown by the flow chart illustrated in FIG. 2. At this time, as is the case with Embodiments 2 and 3, according to the key written flag storing address 18, the key written flag 14 of the EEPROM 4 is read and the value is determined. The base point addresses 16_1, 16_2, and 16_3 and the deviations 17_1, 17_2, and 17_3 are inputted from the exterior, for example via the UART 5, and written in the system area 41 of the EEPROM 4 specified by the base point address storing addresses 21_1, 21_2, and 21_3 and the deviation storing addresses 22_1, 22_2 and 22_3.

The key writing 80 reads the base point addresses 16_1, 16_2, and 16_3 and the deviations 17_1, 17_2, and 17_3, from the system area 41 of the EEPROM 4 specified by the base point address storing addresses 21_1, 21_2, and 21_3 and the deviation storing addresses 22_1, 22_2 and 22_3, and calculates the address to store the split keys. According to the calculated address, the split keys 12_1, 12_2, and 12_3 are written in the EEPROM 4.

Figure 9:
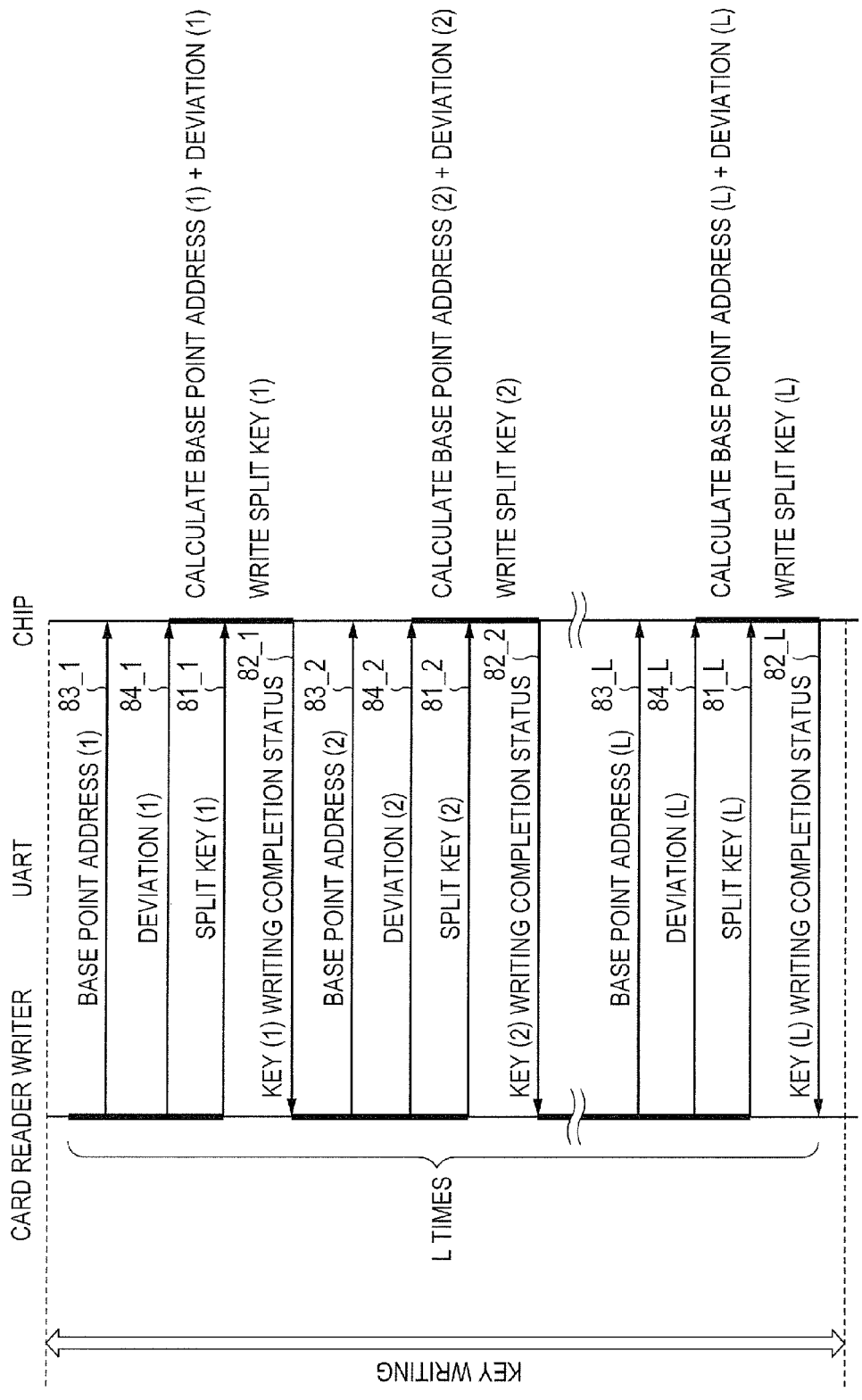
FIG. 9 is an explanatory diagram illustrating an example of a communication flow in key writing in an embodiment in which a base point address and a deviation specify an address to store split keys.

FIG. 9 is an explanatory diagram illustrating an example of a communication flow in the key writing in the present embodiment. A chip of the semiconductor device, such as the LSI illustrated in FIG. 1 or 3, is coupled to a card reader writer via a communication interface, such as the UART 5. The card reader writer is not a card reader writer that a general user uses but it should be a special one that can operate the chip in the system mode and can write in the system area of the EEPROM 4. If an equivalent function is provided with, a logic tester of an LSI or the like may be sufficient.

The base point address 16_1, the deviation 17_1, and the corresponding split key 12_1 are transmitted from the card reader writer to the chip via the communication interface, such as the UART 5, as the base point address 83_1, the deviation 84_1, and the split key 81_1, respectively. The chip calculates the address to store by adding the base point address 16_1 and the deviation 17_1, and writes the split key 12_1 in the calculated address. When the writing is completed, a key writing completion status 82_1 is sent to the card reader writer. The present procedure is repeated L times as the number of divisions.

The key reading 70_1 and 70_2 read out the base point addresses 16_1, 16_2, and 16_3 and the deviations 17_1, 17_2 and 17_3, from the system area 41 of the EEPROM 4 specified by the base point address storing addresses 21_1, 21_2, and 21_3 and the deviation storing address 22_1, 22_2, and 22_3, and calculates the address to store the split keys. According to the calculated address, the split keys 12_1, 12_2, and 12_3 are read from the EEPROM 4 and written in the decrypter 1.

Unlike Embodiments 2 and 3, the address itself to store the split keys 12_1, 12_2, and 12_3 (corresponding to the key storing addresses 19_1, 19_2, and 19_3 in Embodiment 2 and the key addresses 15_1, 15_2, and 15_3 in Embodiment 3) is not stored in any memory of the device. With this configuration, even if the contents of the system area 41 of the EEPROM 4 are dumped by an attack, it is difficult to obtain the address to store the split keys 12_1, 12_2, and 12_3; accordingly, it is possible to improve the security level.

The function for calculating the address to store the split keys 12_1, 12_2, and 12_3 can be determined arbitrarily. The present embodiment specifies the address to store the split keys by a different base point address for every split keys. However, it is also preferable to specify the address to store the split keys by one base point address and plural deviations. In addition, it is also preferable to employ any kind of function for the calculation. Although the function itself is stored in the non-encryption area of the ROM 3 as a part of the program, it is preferable to store the parameter (the base point address and the deviation in the present embodiment) in the system area 41 of the EEPROM 4.

Figure 14:
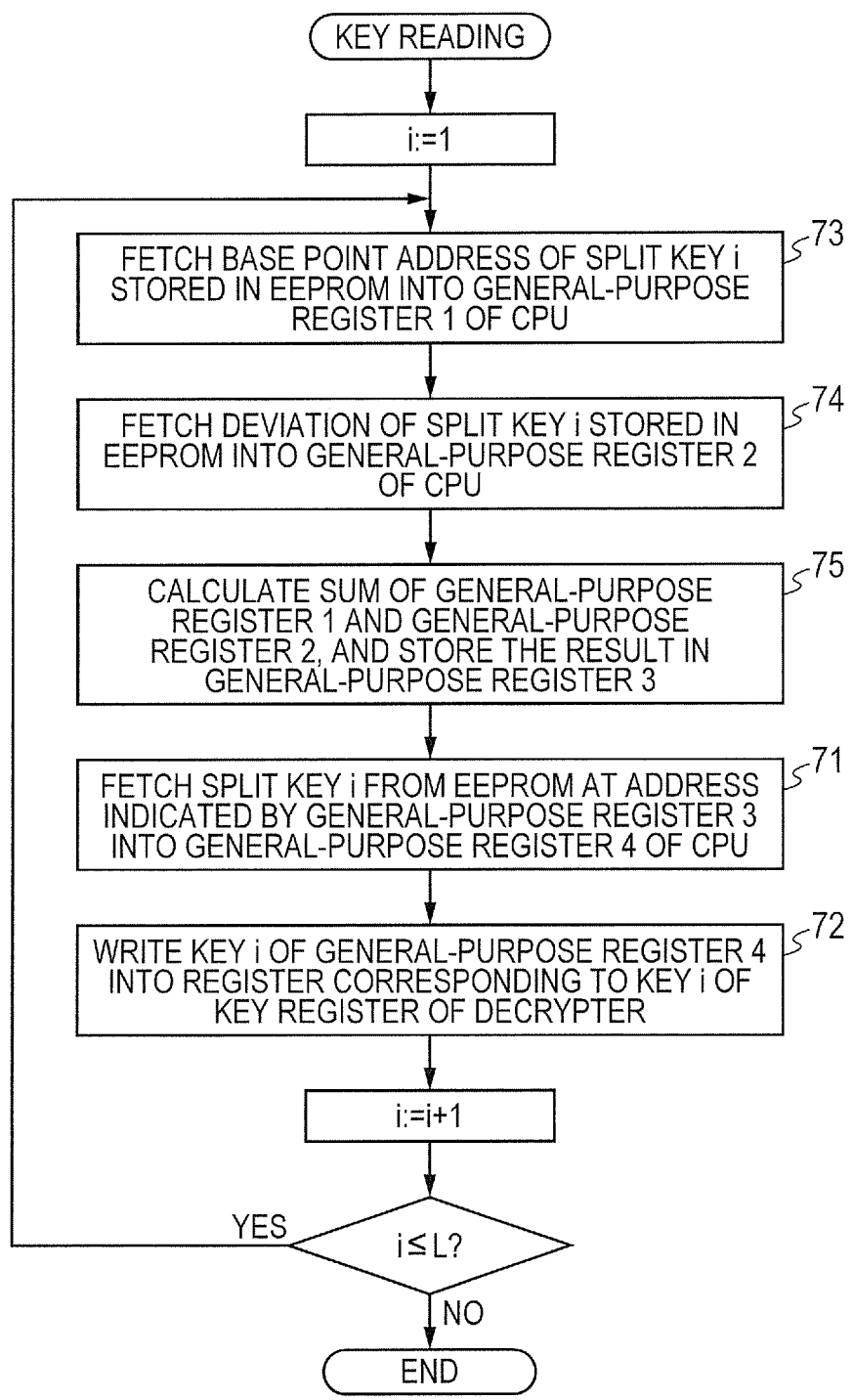
FIG. 14 is a flow chart illustrating key reading (loop) in an embodiment in which a base point address and a deviation specify an address to store split keys.

FIG. 14 is a flow chart illustrating key reading (loop) in the present embodiment in which a base point address and a deviation specify an address to store split keys. The base point address 16_i of the i-th split key 12_i stored in the EEPROM 4 is fetched into a general-purpose register 1 of the CPU 2 (Step 73), and the deviation 17_i is fetched into a general-purpose register 2 of the CPU 2 (Step 74). Next, the sum of the general-purpose register 1 and the general-purpose register 2 is calculated and stored in the general-purpose register 3 (Step 75). This is the address which should store the i-th split key 12_i. Next, the i-th split key 12_i is fetched from the EEPROM 4 at the address indicated by the general-purpose register 3 into the general-purpose register 4 of the CPU 2 (Step 71). The i-th split key 12_i fetched into the general-purpose register 4 is written to a register corresponding to the i-th split key 12_i in the key registers of the decrypter 1 (Step 72). Assuming that the number of divisions of the encryption key is L, Steps 73, 74, 75, 71, and 72 are repeatedly executed by the loop repeating i from 1 to L.

Figure 15:
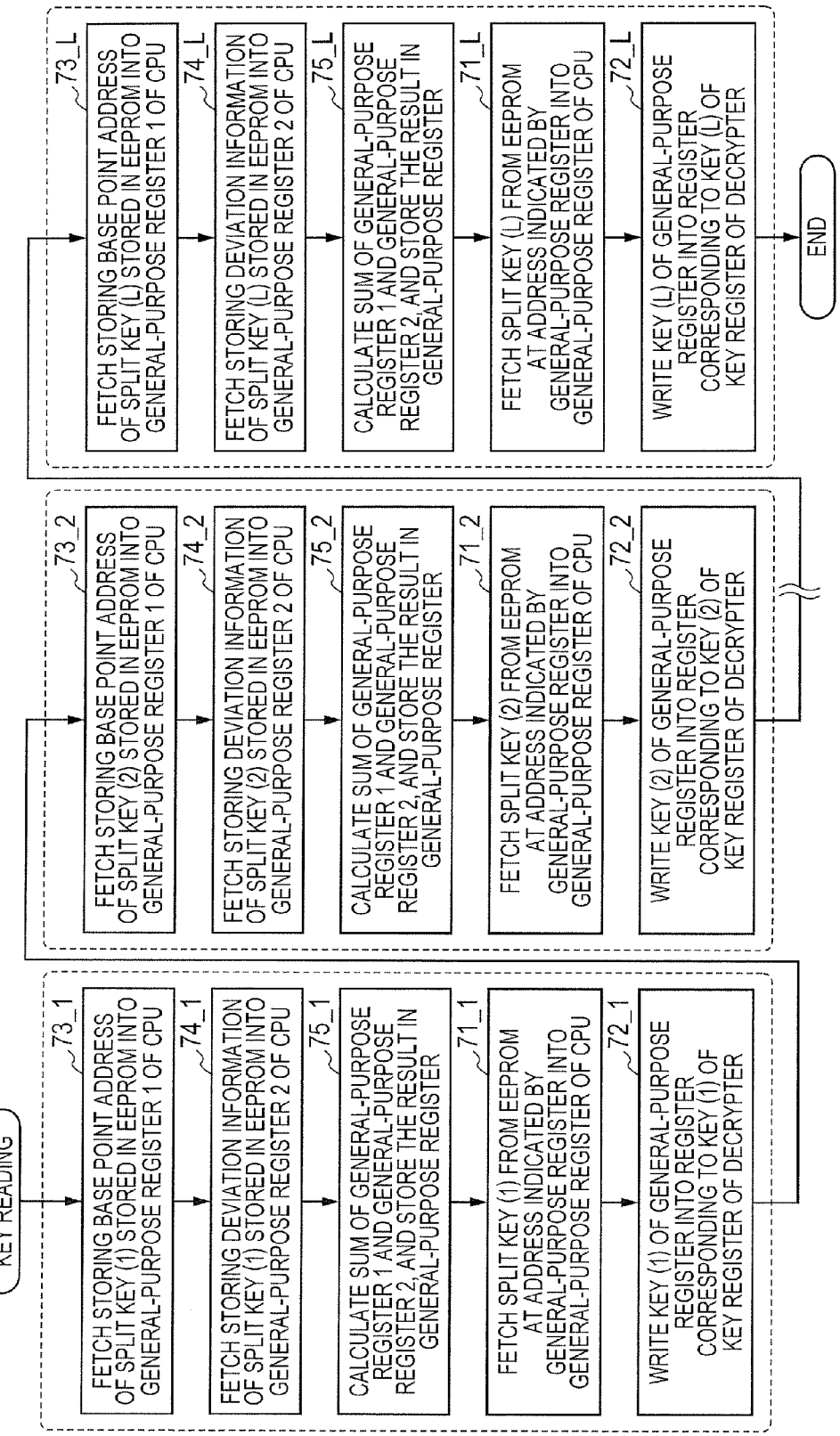
FIG. 15 is a flow chart illustrating key reading (loop unrolling) in an embodiment in which a base point address and a deviation specify an address to store split keys.

FIG. 15 is a flow chart illustrating the key reading (loop unrolling) in the present embodiment. In contrast with the key reading 70 illustrated in FIG. 14 in which Steps 73, 74, 75, 71, and 72 are repeatedly executed by a loop, the key reading according to the present embodiment is executed, not by using a loop, but by the instruction code which describes sequentially L-piece instruction codes of Steps 73, 74, 75, 71, and 72. As is the case with Embodiments 2 and 3, by eliminating the loop control, it is possible to improve the security level against an attack which rewrites only a portion of the key location by destroying temporarily the read value of the register for controlling a loop by means of laser radiation etc. and reducing the loop count.

(Embodiment 5)
<Authentication>

Authentication for key writing (Step 90) is explained in more detail.

There are several methods of the authentication. For an example of the methods, a hash value of the secret input data for authentication is stored in the ROM as an expectation value, and when authenticating, the input data for generating the hash value is employed for the authentication. For another example of the methods, the key information of a block cipher is set as the secret information for authentication, a plaintext is encrypted by the key of the block cipher for authentication as a ciphertext and the pair of the plaintext and the ciphertext are stored in a ROM, and when authenticating, the key information is inputted as an input value, the plaintext stored in the ROM is encrypted by the key inputted, and it is examined whether the ciphertext stored in the ROM is obtained.

In the method using public key encryption, following the concept of DSA, RSA public keys e and N and an expectation value p are stored in the ROM, and a value C which satisfies $p=C^e \mod N$ is inputted from the exterior. When authenticating, $C^e \mod N$ is calculated and confirmed if it is equal to the expectation value p. The value of C can be calculated as $C=p^d \mod N$ using a secret exponent number d of RSA. Calculating C from p is equivalent to solving the RSA encryption. Therefore, when the number of bits of the key is large enough, it is difficult to calculate C from p in realistic computation time. In either of these methods, a third party cannot calculate the expectation value easily from the information stored in the ROM. Therefore, the security level is not impaired by the dumping attack to the ROM.

Figure 7:
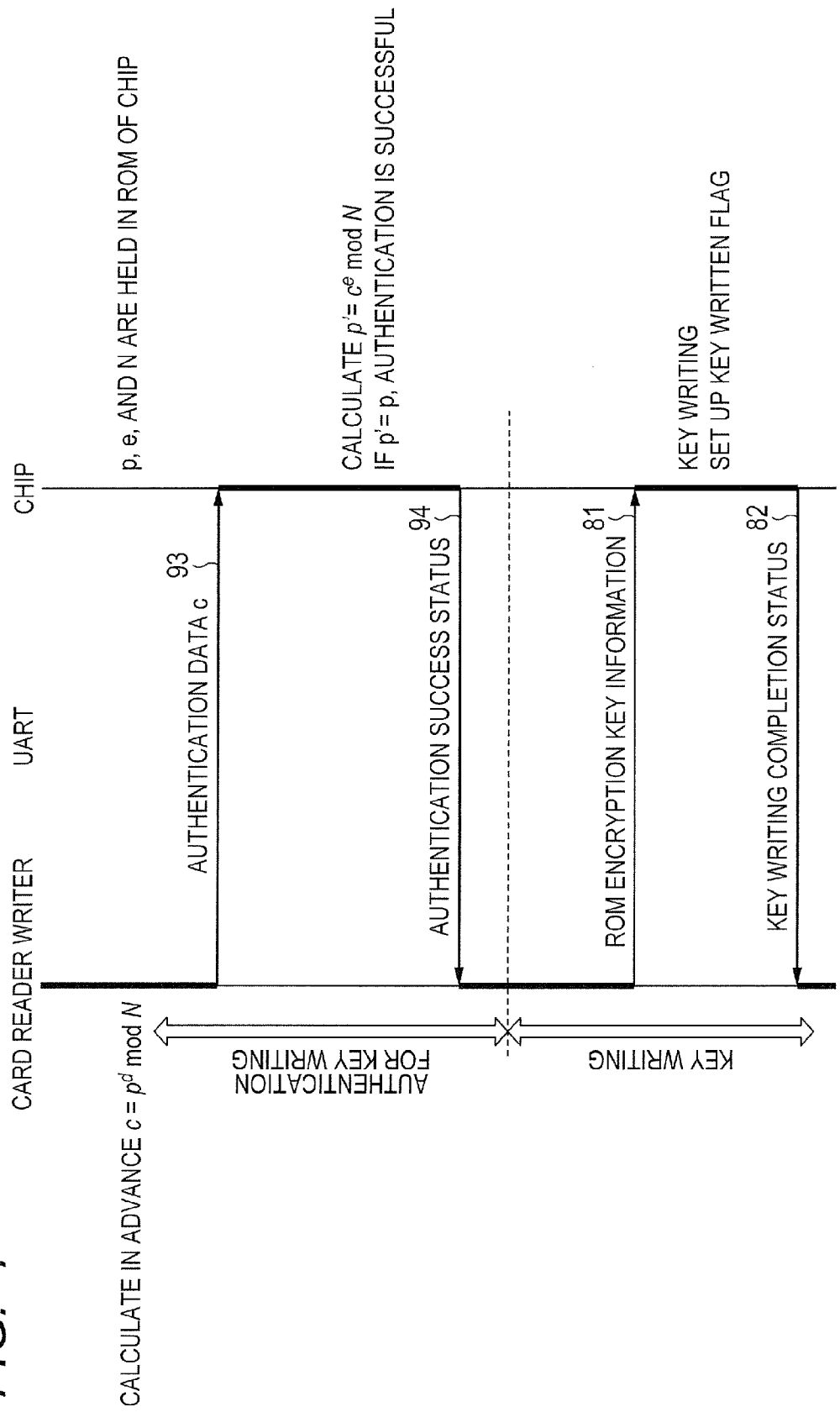
FIG. 7 is an explanatory diagram illustrating an example of a communication flow in key write authentication and key writing.

FIG. 7 is an explanatory diagram illustrating an example of a communication flow in key write authentication and key writing.

The chip of the semiconductor device, such as the LSI illustrated in FIG. 1 or 3, is coupled to a card reader writer via a communication interface, such as the UART 5. The card reader writer is not a card reader writer that a general user uses but it should be a special one that can operate the chip in the system mode and can write in the system area of the EEPROM 4. If an equivalent function is provided with, a logic tester of an LSI or the like may be sufficient.

The card reader writer calculates $c=p^d$ mod N in advance, and transmits c as the authentication data 93 to the chip via the communication interface such as the UART 5. The chip holds p, e, and N in the ROM 3. When c is received as the authentication data 93, $p'=C^e$ mod N is calculated (Step 90). When $p'=p$, the authentication is successful (Step 67). An authentication success status 94 is transmitted to the card reader writer and the authenticating for key writing is completed, then, the flow moves to the key writing (Step 80). When $p' \neq p$, the authentication is unsuccessful, and error processing (Step 66_2) is performed, then, the flow terminates (reset).

In the key writing (Step 80), information 81 of the encryption key 11 stored in the encryption region of the ROM 3 is transmitted from the card reader writer to the chip. The entire of the encryption key 11 may be transmitted collectively, or the encryption key 11 may be divided in advance and transmitted as the split keys 12. The chip performs writing of the key and sets up a key written flag 14. Subsequently, the chip transmits a key writing completion status 82 to the card reader writer, and the key writing (Step 80) is completed.

With this configuration, it is possible to further improve the security level of the authentication which is the premise for the encryption key writing.

Figure 8:
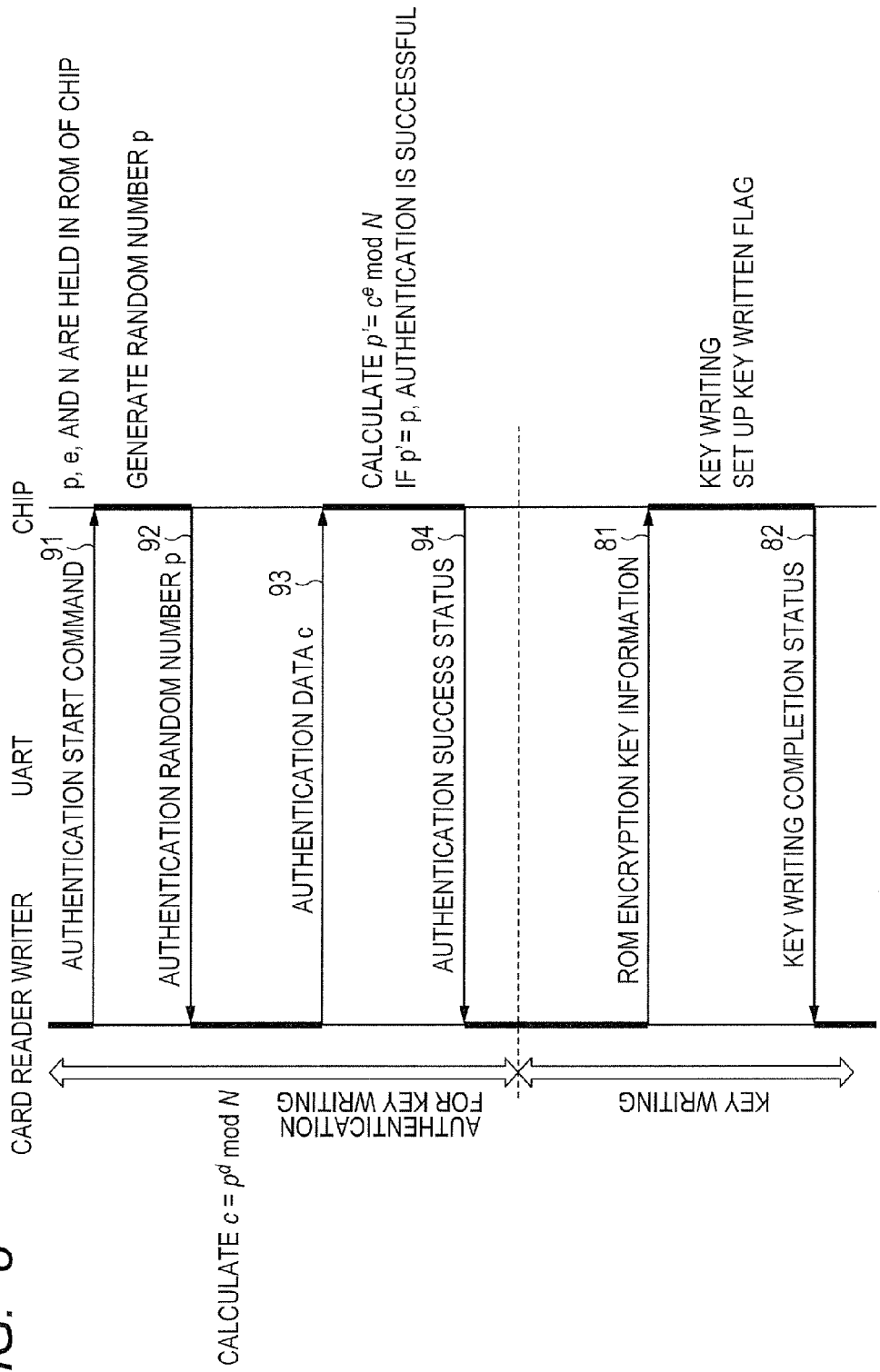
FIG. 8 is an explanatory diagram illustrating another example of a communication flow in key write authentication and key writing.

FIG. 8 is an explanatory diagram illustrating another example of a communication flow in key write authentication and key writing.

The card reader writer transmits an authentication start command 91 to the chip via the communication interface such as the UART 5. The chip holds e and N in the ROM 3, but does not hold the expectation value p. When the authentication start command 91 is received, the chip generates a random number p employed as an expectation value, and transmits it to the card reader writer as an authentication random number 92. Using the received authentication random number p (92), the card reader writer calculates $c=p^d$ mod N, and transmits c to the chip as authentication data 93. When c is received as the authentication data 93, the chip calculates $p'=C^e$ mod N, (Step 90). When $p'=p$, the authentication is successful (Step 67). An authentication success status 94 is transmitted to the card reader writer and the authenticating for key writing is completed, then, the flow moves to the key writing (Step 80). When $p' \neq p$, the authentication is unsuccessful, and error processing (Step 66_2) is performed, then, the flow terminates (reset). Subsequently, the key writing (Step 80) same as in the explanation of FIG. 7 is performed.

The expectation value p of authentication is not stored in the ROM 3, but it is generated internally as a random number for every authenticating. Therefore, the security level is higher.

As described above, the invention accomplished by the present inventors has been concretely explained based on the embodiments. However, it cannot be overemphasized that the present invention is not restricted to the embodiments, and it can be changed variously in the range which does not deviate from the gist.

For example, in Embodiments 2 to 4 and FIGS. 4 to 6, the explanation is made for the number of divisions of the encryption key of three; however, the number of divisions is not restricted to three. It is preferable to set the number of divisions of the encryption key appropriately as explained in Embodiment 1. The embodiment in which the semiconductor device is formed overlying a single semiconductor chip is explained with reference to FIG. 3. However, the present invention is not restricted to the embodiment. For example, it is also preferable that the semiconductor device is implemented as a multichip module formed by laminating plural chips.

What is claimed is:

1. A semiconductor device comprising:
   a central processing unit (CPU) having a first operation mode and a second operation mode;
   an electrically rewritable first nonvolatile memory provided with a first region and a second region, the first region being forbidden to access from the CPU in the second operation mode;
   an electrically non-rewritable second nonvolatile memory provided with a third region and a fourth region, the third region being operable to store an encryption code as at least one of an encrypted instruction and encrypted data; and
   a decrypter,
   wherein the first nonvolatile memory is provided with a plurality of distributed address areas in the first region, for holding a plurality of split keys composing an encryption key for decrypting the encryption code,
   wherein the decrypter holds the encryption key, and in the second operation mode, the decrypter is operable to decrypt the encryption code read from the third region of the second nonvolatile memory with the use of the encryption key, and operable to supply the decrypted encryption code to the CPU, and
   wherein the second nonvolatile memory holds an encryption key reading program in the fourth region, which is executed by the CPU in the first operation mode to restore the encryption key and to supply it to the decrypter, by reading and reconfigurating the split keys held in the first nonvolatile memory in a distributed manner.

2. The semiconductor device according to claim 1, further comprising:
   a communication interface,
   wherein the second nonvolatile memory holds an encryption key writing program in the fourth region, which is executed by the CPU to input the encryption key from the exterior through the communication interface and to write the encryption key in the distributed address areas in the first region of the first nonvolatile memory, in the state where the encryption key is divided into the split keys.

3. The semiconductor device according to claim 2, wherein the encryption key writing program executes an authentication, before the split keys are written in the first nonvolatile memory.

4. The semiconductor device according to claim 3, wherein, before the split keys are written in the first nonvolatile memory, the encryption key writing program determines that the operation mode to be operated by the CPU is the first operation mode, and determines whether the split keys are already written in the first nonvolatile memory, and wherein, when the operation mode to be operated by the CPU is the first operation mode and when the split keys are not yet written in, the encryption key writing program advances to the authentication.

5. The semiconductor device according to claim 4, wherein the first nonvolatile memory is provided with a region for holding data indicative of whether the split keys have already been written in the first region.

6. The semiconductor device according to claim 5, wherein the data indicative of whether the split keys have already been written has a plurality of bits.

7. The semiconductor device according to claim 3, wherein the authentication comprises, as for public keys e and N and an expectation value p of RSA to be held, and using c inputted from the exterior, calculating the remainder of the e-th power of c when divided by N and comparing the remainder with p.

8. The semiconductor device according to claim 2, wherein the second nonvolatile memory holds a program in the fourth region, in which, when it is determined that the operation mode to be operated by the CPU is the second operation mode, the CPU is shifted to the second operation mode after the encryption key reading program is executed by the CPU in the first operation mode.

9. The semiconductor device according to claim 1, wherein the distributed address areas in the first region of the first nonvolatile memory for holding the split keys are discontinuous with respect to the physical address in the first nonvolatile memory, and discontinuous with respect to the logical address for accessing by the CPU.

10. The semiconductor device according to claim 9, wherein at least one of the interval of the physical addresses corresponding to the distributed address areas in the first region of the first nonvolatile memory for holding the split keys and the interval of the logical addresses corresponding to the address areas is unequal.

11. The semiconductor device according to claim 1, wherein the first nonvolatile memory is provided, in the first region, with a key address storing area which stores key address values of the address areas for storing the split keys, and
wherein the second nonvolatile memory holds the address value of the key address storing area in the fourth region.

12. The semiconductor device according to claim 1, wherein each of the addresses corresponding to the distributed address areas in the first region of the first nonvolatile memory for holding the split keys can be calculated by use of a base point address and a deviation, and
wherein the first nonvolatile memory is provided with an address area in the first region for holding the base point address and the deviation.

13. The semiconductor device according to claim 1, wherein the CPU, the first nonvolatile memory, the second nonvolatile memory, and the decrypter are formed overlying a single semiconductor substrate.

14. An encryption key writing method for writing an encryption key to a semiconductor device, the method comprising:
providing the semiconductor device comprising:
a central processing unit (CPU) having a first operation mode and a second operation mode;
an electrically rewritable first nonvolatile memory provided with a first region and a second region, the first region being forbidden to access from the CPU in the second operation mode;
an electrically non-rewritable second nonvolatile memory provided with a third region and a fourth region, the third region being operable to store an encryption code as at least one of an encrypted instruction and encrypted data;
a decrypter operable to decrypt the encryption code read from the third region of the second nonvolatile memory with the use of an encryption key and operable to supply the decrypted encryption code to the CPU in the second operation mode; and
a communication interface,
inputting the encryption key from the exterior through the communication interface, and
writing the inputted encryption key in a plurality of distributed address areas in the first region of the first nonvolatile memory, in the state where the encryption key is divided into a plurality of split keys.

15. The encryption key writing method according to claim 14, further comprising before the writing of the inputted encryption key:
confirming that the operation mode to be operated by the CPU is the first operation mode;
confirming that the split keys are not written in the address areas of the first nonvolatile memory, and
authenticating the write of the encryption key.

16. The encryption key writing method according to claim 15, further comprising:
restoring the encryption key and supplying it to the decrypter in the first operation mode, by reading and reconfigurating the split keys held in the first nonvolatile memory in a distributed manner, when it is determined that the operation mode to be operated by the CPU is the second operation mode, and
shifting the operation mode of the CPU to the second operation mode.

17. The encryption key writing method according to claim 14, wherein the distributed address areas in the first region of the first nonvolatile memory for holding the split keys are discontinuous with respect to the physical address in the first nonvolatile memory, and discontinuous with respect to the logical address for accessing by the CPU.

18. The encryption key writing method according to claim 17, wherein at least one of the interval of the physical addresses corresponding to the distributed address areas in the first region of the first nonvolatile memory for holding the split keys and the interval of the logical addresses corresponding to the address areas is unequal.

19. The encryption key writing method according to claim 16, further comprising:
reading the key storing address indicative of each of the distributed address areas for storing the split keys in the first region of the first nonvolatile memory from one of the first region of the first nonvolatile memory and the fourth region of the second nonvolatile memory.

20. The encryption key writing method according to claim 19, further comprising:
inputting a base point address and a deviation from the exterior through the communication interface, the base point address and the deviation being employed to calculate the key storing address indicative of each of the address areas for storing the split keys in the first region of the first nonvolatile memory in a distributed manner.

* * * * *